(12) United States Patent
Bergström et al.

(10) Patent No.: US 12,524,116 B2
(45) Date of Patent: Jan. 13, 2026

(54) DETECTION LINE BROADENING

(71) Applicant: FlatFrog Laboratories AB, Lund (SE)

(72) Inventors: Håkan Bergström, Torna-Hällestad (SE); Thomas Craven-Bartle, Sodra Sandby (SE); Tomas Svensson, Limhamn (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 18/155,669

(22) Filed: Jan. 17, 2023

(65) Prior Publication Data
US 2023/0229266 A1 Jul. 20, 2023

Related U.S. Application Data

(63) Continuation of application No. 16/977,665, filed as application No. PCT/SE2019/050189 on Mar. 5, 2019, now Pat. No. 11,567,610.

(30) Foreign Application Priority Data

Mar. 5, 2018 (SE) .................................. 1830076-4

(51) Int. Cl.
*G06F 3/042* (2006.01)
*G02B 5/02* (2006.01)
*G02B 6/42* (2006.01)

(52) U.S. Cl.
CPC .......... *G06F 3/0421* (2013.01); *G02B 5/021* (2013.01); *G02B 5/0236* (2013.01);
(Continued)

(58) Field of Classification Search
CPC ..... G06F 3/0421; G02B 5/021; G02B 5/0236; G02B 5/0278; G02B 5/0284; G02B 6/4206
See application file for complete search history.

(56) References Cited

U.S. PATENT DOCUMENTS

| | | | |
|---|---|---|---|
| 3,375,053 A | 3/1968 | Ward | |
| 3,440,426 A | 4/1969 | Bush | |
| (Continued) | | | |

FOREIGN PATENT DOCUMENTS

| | | |
|---|---|---|
| AU | 2008 280 952 A1 | 3/2009 |
| AU | 2014201966 | 4/2014 |
| (Continued) | | |

OTHER PUBLICATIONS

Ahn, Y., et al., "A slim and wide multi-touch tabletop interface and its applications," BigComp2014, IEEE, 2014, in 6 pages.
(Continued)

*Primary Examiner* — Benyam Ketema
(74) *Attorney, Agent, or Firm* — Knobbe, Martens, Olson & Bear, LLP

(57) ABSTRACT

A touch sensing apparatus is disclosed comprising a panel that defines a touch surface, a plurality of emitters and detectors arranged along a perimeter of the light transmissive panel, and a light directing arrangement arranged adjacent the perimeter. The emitters are arranged to emit a respective beam of emitted light and the light directing arrangement is arranged to direct the light along a light path from the emitters to the touch surface. A diffusive light scattering element is arranged in the light path.

19 Claims, 13 Drawing Sheets

(52) U.S. Cl.
CPC ......... *G02B 5/0278* (2013.01); *G02B 5/0284* (2013.01); *G02B 6/4206* (2013.01)

(56) References Cited

U.S. PATENT DOCUMENTS

| | | | |
|---|---|---|---|
| 3,478,220 A * | 11/1969 | Milroy ................. | G06F 3/0421 250/221 |
| 3,553,680 A | 1/1971 | Cooreman | |
| 3,673,327 A | 6/1972 | Johnson et al. | |
| 4,129,384 A | 12/1978 | Walker et al. | |
| 4,180,702 A | 12/1979 | Sick et al. | |
| 4,209,255 A | 6/1980 | Heynau et al. | |
| 4,213,707 A | 7/1980 | Evans, Jr. | |
| 4,254,333 A | 3/1981 | Bergström | |
| 4,254,407 A | 3/1981 | Tipon | |
| 4,294,543 A | 10/1981 | Apple et al. | |
| 4,346,376 A | 8/1982 | Mallos | |
| 4,420,261 A | 12/1983 | Barlow et al. | |
| 4,459,476 A | 7/1984 | Weissmueller et al. | |
| 4,484,179 A | 11/1984 | Kasday | |
| 4,507,557 A * | 3/1985 | Tsikos ................. | G06F 3/0421 250/221 |
| 4,521,112 A | 6/1985 | Kuwabara et al. | |
| 4,542,375 A * | 9/1985 | Alles .................. | G06F 3/042 345/176 |
| 4,550,250 A | 10/1985 | Mueller et al. | |
| 4,593,191 A | 6/1986 | Alles | |
| 4,673,918 A | 6/1987 | Adler et al. | |
| 4,688,933 A | 8/1987 | Lapeyre | |
| 4,688,993 A | 8/1987 | Ferris et al. | |
| 4,692,809 A | 9/1987 | Beining et al. | |
| 4,710,760 A * | 12/1987 | Kasday ................. | G06F 3/0421 250/221 |
| 4,736,191 A | 4/1988 | Matzke et al. | |
| 4,737,626 A | 4/1988 | Hasegawa | |
| 4,746,770 A * | 5/1988 | McAvinney .......... | G06F 3/0421 250/221 |
| 4,751,379 A | 6/1988 | Sasaki et al. | |
| 4,752,655 A | 6/1988 | Tajiri et al. | |
| 4,766,424 A * | 8/1988 | Adler .................... | G06F 3/0421 250/221 |
| 4,772,763 A | 9/1988 | Garwin et al. | |
| 4,782,328 A | 11/1988 | Denlinger | |
| 4,812,833 A | 3/1989 | Shimauchi | |
| 4,837,430 A | 6/1989 | Hasegawa | |
| 4,868,550 A * | 9/1989 | Sasaki .................. | G06F 3/0421 250/221 |
| 4,868,912 A | 9/1989 | Doering | |
| 4,891,829 A | 1/1990 | Deckman et al. | |
| 4,916,308 A | 4/1990 | Meadows | |
| 4,916,712 A | 4/1990 | Bender | |
| 4,933,544 A | 6/1990 | Tamaru | |
| 4,949,079 A | 8/1990 | Loebner | |
| 4,986,662 A | 1/1991 | Bures | |
| 4,988,983 A | 1/1991 | Wehrer | |
| 5,065,185 A | 11/1991 | Powers et al. | |
| 5,073,770 A | 12/1991 | Lowbner | |
| 5,105,186 A | 4/1992 | May | |
| 5,155,813 A | 10/1992 | Donoghue et al. | |
| 5,159,322 A | 10/1992 | Loebner | |
| 5,162,783 A | 11/1992 | Moreno | |
| 5,166,668 A | 11/1992 | Aoyagi | |
| 5,175,030 A | 12/1992 | Lu et al. | |
| 5,227,622 A | 7/1993 | Suzuki | |
| 5,248,856 A | 9/1993 | Mallicoat | |
| 5,254,407 A | 10/1993 | Sergerie et al. | |
| 5,345,490 A | 9/1994 | Finnigan et al. | |
| 5,383,022 A * | 1/1995 | Kaser .................. | G01B 11/02 250/559.19 |
| 5,414,413 A * | 5/1995 | Tamaru ................ | G06F 3/0421 345/173 |
| 5,434,373 A | 7/1995 | Komaki | |
| 5,483,261 A | 1/1996 | Yasutake | |
| 5,484,966 A | 1/1996 | Segen | |
| 5,499,098 A | 3/1996 | Ogawa | |
| 5,502,568 A | 3/1996 | Ogawa et al. | |
| 5,515,083 A | 5/1996 | Casebolt et al. | |
| 5,525,764 A * | 6/1996 | Junkins ................ | G06F 3/0423 345/182 |
| 5,526,422 A | 6/1996 | Keen | |
| 5,539,514 A | 7/1996 | Shishido et al. | |
| 5,543,591 A | 8/1996 | Gillespie et al. | |
| 5,570,181 A | 10/1996 | Yasuo et al. | |
| 5,572,251 A | 11/1996 | Ogawa | |
| 5,577,501 A | 11/1996 | Flohr et al. | |
| 5,600,105 A | 2/1997 | Fukuzaki et al. | |
| 5,605,406 A | 2/1997 | Bowen | |
| 5,608,550 A | 3/1997 | Epstein et al. | |
| 5,672,852 A | 9/1997 | Fukuzaki et al. | |
| 5,677,082 A | 10/1997 | Greinke et al. | |
| 5,679,930 A | 10/1997 | Katsurahira | |
| 5,686,942 A | 11/1997 | Ball | |
| 5,688,933 A | 11/1997 | Evans et al. | |
| 5,729,249 A | 3/1998 | Yasutake | |
| 5,729,250 A | 3/1998 | Bishop et al. | |
| 5,736,686 A | 4/1998 | Perret, Jr. et al. | |
| 5,740,224 A | 4/1998 | Müller et al. | |
| 5,746,423 A | 5/1998 | Arov | |
| 5,764,223 A | 6/1998 | Chang et al. | |
| 5,767,517 A | 6/1998 | Hawkins | |
| 5,775,792 A | 7/1998 | Wiese | |
| 5,808,606 A | 9/1998 | Kodama et al. | |
| 5,945,980 A | 8/1999 | Moissev et al. | |
| 5,945,981 A | 8/1999 | Paull et al. | |
| 5,959,617 A | 9/1999 | Bird et al. | |
| 6,031,524 A | 2/2000 | Kunert | |
| 6,061,177 A | 5/2000 | Fujimoto | |
| 6,067,079 A | 5/2000 | Shieh | |
| 6,100,538 A | 8/2000 | Ogawa | |
| 6,122,394 A | 9/2000 | Neukermans et al. | |
| 6,130,663 A | 10/2000 | Null | |
| 6,141,104 A | 10/2000 | Schulz et al. | |
| 6,172,667 B1 | 1/2001 | Sayag | |
| 6,175,999 B1 | 1/2001 | Sloan et al. | |
| 6,227,667 B1 | 5/2001 | Halldorsson et al. | |
| 6,229,529 B1 | 5/2001 | Yano et al. | |
| 6,315,156 B1 | 11/2001 | Mahoney et al. | |
| 6,333,735 B1 | 12/2001 | Anvekar | |
| 6,340,967 B1 | 1/2002 | Maxted | |
| 6,366,276 B1 | 4/2002 | Kunimatsu et al. | |
| 6,380,732 B1 | 4/2002 | Gilboa | |
| 6,380,740 B1 | 4/2002 | Laub | |
| 6,390,370 B1 | 5/2002 | Plesko | |
| 6,429,857 B1 * | 8/2002 | Masters ................ | G06F 3/0421 345/173 |
| 6,452,996 B1 | 9/2002 | Hsieh | |
| 6,476,797 B1 | 11/2002 | Kurihara et al. | |
| 6,492,633 B2 | 12/2002 | Nakazawa et al. | |
| 6,495,832 B1 * | 12/2002 | Kirby .................... | G06F 3/0421 250/222.2 |
| 6,504,143 B2 | 1/2003 | Koops et al. | |
| 6,504,530 B1 | 1/2003 | Wilson et al. | |
| 6,524,749 B1 | 2/2003 | Kaneda et al. | |
| 6,529,327 B1 | 3/2003 | Graindorge | |
| 6,535,213 B1 | 3/2003 | Ogino et al. | |
| 6,538,644 B1 | 3/2003 | Muraoka | |
| 6,587,099 B2 | 7/2003 | Takekawa | |
| 6,648,485 B1 | 11/2003 | Colgan et al. | |
| 6,660,964 B1 | 12/2003 | Benderly | |
| 6,664,498 B2 | 12/2003 | Forsman et al. | |
| 6,664,952 B2 | 12/2003 | Iwamoto et al. | |
| 6,677,934 B1 * | 1/2004 | Blanchard ............ | G06F 3/0421 250/221 |
| 6,690,363 B2 * | 2/2004 | Newton ................ | G06F 3/0421 345/173 |
| 6,692,807 B2 | 2/2004 | Bries et al. | |
| 6,707,027 B2 | 3/2004 | Liess et al. | |
| 6,710,767 B1 | 3/2004 | Hasegawa et al. | |
| 6,738,051 B2 | 5/2004 | Boyd et al. | |
| 6,748,098 B1 | 6/2004 | Rosenfeld | |
| 6,784,948 B2 | 8/2004 | Kawashima et al. | |
| 6,799,141 B1 | 9/2004 | Stoustrup et al. | |
| 6,803,900 B1 | 10/2004 | Berkoff et al. | |

(56) References Cited

U.S. PATENT DOCUMENTS

| | | | |
|---|---|---|---|
| 6,806,871 B1 | 10/2004 | Yasue | |
| 6,828,959 B2 | 12/2004 | Takekawa et al. | |
| 6,911,646 B1 | 6/2005 | Weitekamp | |
| 6,927,384 B2 | 8/2005 | Reime et al. | |
| 6,940,286 B2 | 9/2005 | Wang et al. | |
| 6,965,836 B2 | 11/2005 | Richardson | |
| 6,972,401 B2* | 12/2005 | Akitt | G06F 3/0428 250/221 |
| 6,972,753 B1* | 12/2005 | Kimura | G06F 3/0421 178/18.09 |
| 6,985,137 B2 | 1/2006 | Kaikuranta | |
| 7,042,444 B2* | 5/2006 | Cok | H10K 59/40 313/506 |
| 7,084,859 B1 | 8/2006 | Pryor | |
| 7,087,907 B1 | 8/2006 | Lalovic et al. | |
| 7,117,157 B1 | 10/2006 | Taylor et al. | |
| 7,133,031 B2 | 11/2006 | Wang et al. | |
| 7,133,032 B2* | 11/2006 | Cok | G06F 3/0412 345/175 |
| 7,151,530 B2 | 12/2006 | Roeber et al. | |
| 7,176,904 B2 | 2/2007 | Satoh | |
| 7,199,932 B2 | 4/2007 | Sugiura | |
| 7,359,041 B2 | 4/2008 | Xie et al. | |
| 7,397,418 B1 | 7/2008 | Doerry et al. | |
| 7,432,893 B2* | 10/2008 | Ma | G06F 3/0421 345/87 |
| 7,435,940 B2 | 10/2008 | Eliasson et al. | |
| 7,436,443 B2 | 10/2008 | Hirunuma et al. | |
| 7,442,914 B2 | 10/2008 | Eliasson et al. | |
| 7,465,914 B2* | 12/2008 | Eliasson | G06F 3/0421 250/221 |
| 7,528,898 B2* | 5/2009 | Hashimoto | G02F 1/133308 349/58 |
| D602,498 S | 10/2009 | Arnell | |
| 7,613,375 B2 | 11/2009 | Shimizu | |
| 7,629,968 B2 | 12/2009 | Miller et al. | |
| 7,646,379 B1* | 1/2010 | Drennan | G06F 3/046 345/173 |
| 7,646,833 B1 | 1/2010 | He et al. | |
| 7,653,883 B2 | 1/2010 | Hotelling et al. | |
| 7,655,901 B2 | 2/2010 | Idzik et al. | |
| 7,705,835 B2* | 4/2010 | Eikman | G06F 3/0425 345/173 |
| 7,712,041 B2 | 5/2010 | Toyama et al. | |
| 7,729,056 B2 | 6/2010 | Hwang et al. | |
| 7,812,826 B2 | 10/2010 | Ording et al. | |
| 7,847,789 B2 | 12/2010 | Kolmykov-Zotov et al. | |
| 7,855,716 B2 | 12/2010 | McCreary et al. | |
| 7,859,519 B2 | 12/2010 | Tulbert | |
| 7,924,272 B2 | 4/2011 | Boer et al. | |
| 7,932,899 B2 | 4/2011 | Newton et al. | |
| 7,956,847 B2 | 6/2011 | Christie | |
| 7,969,410 B2 | 6/2011 | Kakarala | |
| 7,995,039 B2* | 8/2011 | Eliasson | G06F 3/0421 345/173 |
| 8,013,845 B2 | 9/2011 | Ostergaard et al. | |
| 8,031,186 B2 | 10/2011 | Ostergaard | |
| 8,077,147 B2 | 12/2011 | Krah et al. | |
| 8,093,545 B2* | 1/2012 | Leong | G06F 3/03543 345/157 |
| 8,094,136 B2 | 1/2012 | Eliasson et al. | |
| 8,094,910 B2 | 1/2012 | Xu | |
| 8,139,046 B2 | 3/2012 | Kweon et al. | |
| 8,149,211 B2 | 4/2012 | Hayakawa et al. | |
| 8,149,221 B2* | 4/2012 | Newton | G06F 3/0436 345/173 |
| 8,154,418 B2 | 4/2012 | Peterson et al. | |
| 8,184,108 B2* | 5/2012 | Smits | G06F 3/0421 345/173 |
| 8,194,036 B1 | 6/2012 | Braun et al. | |
| 8,217,854 B2 | 7/2012 | Bhogal et al. | |
| 8,218,154 B2 | 7/2012 | Østergaard et al. | |
| 8,274,495 B2 | 9/2012 | Lee | |
| D669,497 S | 10/2012 | Lee et al. | |
| 8,314,773 B2* | 11/2012 | Low | G06F 3/03547 345/173 |
| 8,319,729 B2* | 11/2012 | Choi | G06F 3/0421 345/173 |
| 8,325,158 B2* | 12/2012 | Yatsuda | G06F 3/0421 345/87 |
| 8,339,379 B2 | 12/2012 | Goertz et al. | |
| 8,345,023 B1* | 1/2013 | Drennan | G06F 3/03545 345/173 |
| 8,350,827 B2 | 1/2013 | Chung et al. | |
| D675,644 S | 2/2013 | Frost et al. | |
| 8,384,010 B2 | 2/2013 | Hong et al. | |
| 8,384,693 B2* | 2/2013 | Newton | G06F 3/0421 178/18.09 |
| 8,407,606 B1 | 3/2013 | Davidson et al. | |
| 8,436,833 B2 | 5/2013 | King et al. | |
| 8,441,467 B2 | 5/2013 | Han | |
| 8,445,834 B2 | 5/2013 | Hong et al. | |
| 8,466,901 B2 | 6/2013 | Yen et al. | |
| 8,482,547 B2 | 7/2013 | Cobon et al. | |
| 8,542,217 B2 | 9/2013 | Wassvik et al. | |
| 8,553,014 B2 | 10/2013 | Holmgren et al. | |
| 8,567,257 B2 | 10/2013 | Van Steenberge et al. | |
| 8,571,171 B2 | 10/2013 | Tischenko et al. | |
| 8,581,884 B2 | 11/2013 | Fåhraeus et al. | |
| 8,587,562 B2 | 11/2013 | Goertz et al. | |
| 8,599,140 B2 | 12/2013 | Crockett et al. | |
| 8,610,672 B2 | 12/2013 | Kun et al. | |
| 8,624,858 B2 | 1/2014 | Fyke et al. | |
| 8,674,963 B2 | 3/2014 | Cornish et al. | |
| 8,676,007 B2 | 3/2014 | Holmgren et al. | |
| 8,686,974 B2 | 4/2014 | Christiansen et al. | |
| 8,692,807 B2 | 4/2014 | Føhraeus et al. | |
| 8,716,614 B2 | 5/2014 | Wassvik | |
| 8,727,581 B2 | 5/2014 | Saccomanno | |
| 8,745,514 B1 | 6/2014 | Davidson | |
| 8,749,527 B2 | 6/2014 | Douxchamps et al. | |
| 8,780,066 B2* | 7/2014 | Christiansson | G06F 3/0421 345/173 |
| 8,830,181 B1 | 9/2014 | Clark et al. | |
| 8,837,882 B2 | 9/2014 | Holmgren et al. | |
| 8,860,696 B2 | 10/2014 | Wassvik et al. | |
| 8,866,870 B1 | 10/2014 | Smith | |
| 8,872,098 B2 | 10/2014 | Bergström et al. | |
| 8,872,801 B2* | 10/2014 | Bergstrom | G06F 3/042 345/173 |
| D716,820 S | 11/2014 | Wood | |
| 8,884,900 B2 | 11/2014 | Wassvik | |
| 8,890,843 B2 | 11/2014 | Wassvik et al. | |
| 8,890,849 B2 | 11/2014 | Christiansson et al. | |
| 8,896,575 B2 | 11/2014 | Goertz et al. | |
| 8,902,196 B2 | 12/2014 | Goertz et al. | |
| 8,913,035 B2 | 12/2014 | Lai et al. | |
| 8,922,526 B2 | 12/2014 | Wang | |
| 8,928,590 B1 | 1/2015 | El Dokor | |
| 8,928,609 B2 | 1/2015 | Italia et al. | |
| 8,963,886 B2* | 2/2015 | Wassvik | G06F 3/0421 345/173 |
| 8,982,084 B2 | 3/2015 | Christiansson et al. | |
| 9,001,086 B1* | 4/2015 | Saini | G06F 3/0428 345/175 |
| 9,024,896 B2 | 5/2015 | Chen | |
| 9,024,916 B2 | 5/2015 | Christiansson | |
| 9,035,909 B2* | 5/2015 | Christiansson | G06F 3/0421 345/177 |
| 9,052,771 B2 | 6/2015 | Goertz et al. | |
| 9,063,614 B2* | 6/2015 | Pettersson | G06F 3/0425 |
| 9,063,617 B2 | 6/2015 | Eliasson et al. | |
| 9,086,763 B2 | 7/2015 | Johansson et al. | |
| 9,092,091 B2 | 7/2015 | Piot et al. | |
| 9,092,094 B1 | 7/2015 | Baldwin | |
| 9,128,250 B2 | 9/2015 | Charters et al. | |
| 9,134,854 B2* | 9/2015 | Wassvik | G06F 3/0423 |
| 9,137,891 B2 | 9/2015 | Gibbs et al. | |
| 9,158,401 B2 | 10/2015 | Christiansson | |
| 9,158,415 B2* | 10/2015 | Song | G06F 3/0421 |
| 9,158,416 B2 | 10/2015 | Eriksson et al. | |
| 9,164,625 B2 | 10/2015 | Holmgren et al. | |

(56) References Cited

U.S. PATENT DOCUMENTS

| | | |
|---|---|---|
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 * | 12/2015 | King .................... G06F 3/0421 |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Uvnäs |
| 9,366,802 B2 | 6/2016 | Lee et al. |
| 9,377,882 B2 | 6/2016 | Kim |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Hhne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,619,084 B2 * | 4/2017 | Deichmann ........... G06F 3/0421 |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,652,082 B1 | 5/2017 | Lin et al. |
| 9,671,900 B2 | 6/2017 | Piot et al. |
| 9,678,601 B2 | 6/2017 | Pettersson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,720,499 B2 | 8/2017 | Han et al. |
| 9,741,184 B2 | 8/2017 | Iyer et al. |
| D798,893 S | 10/2017 | Anzures et al. |
| 9,785,287 B2 | 10/2017 | Bergstrom et al. |
| 9,811,163 B2 | 11/2017 | Eriksson et al. |
| 9,811,209 B2 | 11/2017 | Christiansson et al. |
| 9,817,510 B2 | 11/2017 | Kim |
| D807,388 S | 1/2018 | Butcher et al. |
| D808,416 S | 1/2018 | Anzures et al. |
| 9,857,916 B2 | 1/2018 | Bergstrm et al. |
| 9,857,917 B2 | 1/2018 | Wassvik et al. |
| 9,864,470 B2 | 1/2018 | Christiansson |
| 9,874,978 B2 | 1/2018 | Wall |
| 9,921,661 B2 | 3/2018 | Eriksson et al. |
| 9,927,921 B2 | 3/2018 | Lee |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazay et al. |
| 10,031,623 B2 | 7/2018 | Christiansson et al. |
| 10,048,773 B2 | 8/2018 | Fahraeus et al. |
| 10,088,919 B2 | 10/2018 | Tamura |
| 10,088,957 B2 | 10/2018 | Johansson et al. |
| 10,126,882 B2 | 11/2018 | Wassvik |
| 10,126,897 B2 | 11/2018 | Kwon et al. |
| 10,139,854 B2 | 11/2018 | Krishnakumar et al. |
| 10,146,376 B2 | 12/2018 | Wassvik et al. |
| 10,151,866 B2 | 12/2018 | Craven-Bartle et al. |
| 10,152,176 B2 | 12/2018 | Wallander |
| 10,161,886 B2 | 12/2018 | Ohlsson et al. |
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,261,639 B2 | 4/2019 | Lee et al. |
| 10,268,288 B1 | 4/2019 | Wang et al. |
| 10,268,319 B2 | 4/2019 | Wassvik et al. |
| 10,282,035 B2 | 5/2019 | Kocovksi et al. |
| 10,317,200 B1 | 6/2019 | Han et al. |
| 10,318,041 B2 | 6/2019 | Björklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,459,590 B2 | 10/2019 | Lin et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | van Beek et al. |
| 10,691,638 B1 | 6/2020 | Lyadvinsky et al. |
| D892,855 S | 8/2020 | Liu |
| 10,739,916 B2 | 8/2020 | Skagmo et al. |
| 10,761,657 B2 | 9/2020 | Christiansson et al. |
| 10,775,935 B2 | 9/2020 | Kocovski et al. |
| 10,775,937 B2 | 9/2020 | Christiansson et al. |
| 10,845,923 B2 | 11/2020 | Skagmo et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,892,303 B2 | 1/2021 | Li |
| 10,963,104 B2 | 3/2021 | Bergström et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,188,730 B1 | 11/2021 | Kwon et al. |
| 11,243,640 B2 | 2/2022 | Ancona et al. |
| 11,256,371 B2 | 2/2022 | Bergstrom et al. |
| 11,263,028 B2 | 3/2022 | Momchilov |
| 11,269,460 B2 | 3/2022 | Skagmo et al. |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Kocovski et al. |
| 11,567,610 B2 | 1/2023 | Bergstrom et al. |
| 11,579,731 B2 | 2/2023 | Kocovski et al. |
| 11,579,732 B2 | 2/2023 | Skagmo et al. |
| 11,650,699 B2 * | 5/2023 | Bergström ............ G06F 3/0416 345/176 |
| 11,740,741 B2 | 8/2023 | Bergström et al. |
| 11,868,568 B2 | 1/2024 | Kocovski et al. |
| 11,893,189 B2 * | 2/2024 | Bergström ............ G06F 3/0421 |
| 11,909,033 B2 | 2/2024 | Tsuzuki et al. |
| 11,914,819 B2 | 2/2024 | Kocovski et al. |

(56) References Cited

U.S. PATENT DOCUMENTS

| | | |
|---|---|---|
| 11,943,563 B2 | 3/2024 | Wassvik et al. |
| 12,055,969 B2 | 8/2024 | Svensson et al. |
| 12,056,316 B2 | 8/2024 | Andersson et al. |
| 12,086,362 B2 | 9/2024 | Bergström et al. |
| 12,135,847 B2 | 11/2024 | Andreasson |
| 12,175,044 B2 | 12/2024 | Bergström et al. |
| 12,282,653 B2 | 4/2025 | Andreasson et al. |
| 12,386,461 B2 | 8/2025 | Bergström et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0067348 A1 | 6/2002 | Masters et al. |
| 2002/0075243 A1 | 6/2002 | Newton |
| 2002/0085003 A1 | 7/2002 | Nagashima |
| 2002/0118177 A1 | 8/2002 | Newton |
| 2002/0130883 A1 | 9/2002 | Huang et al. |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0085882 A1 | 5/2003 | Lu |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0130338 A1 | 7/2004 | Wang et al. |
| 2004/0134772 A1 | 7/2004 | Cohen et al. |
| 2004/0136564 A1 | 7/2004 | Roeber et al. |
| 2004/0174541 A1 | 9/2004 | Freifeld |
| 2004/0179001 A1 | 9/2004 | Morrison et al. |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0005319 A1 | 1/2005 | Della-Cioppa et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0052635 A1 | 3/2005 | Xie et al. |
| 2005/0053191 A1 | 3/2005 | Gohno et al. |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0237317 A1 | 10/2005 | Cok |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1 | 5/2006 | Cok |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0161871 A1 | 7/2006 | Hotelling et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |
| 2007/0125937 A1 | 6/2007 | Eliasson et al. |
| 2007/0146337 A1 | 6/2007 | Ording et al. |
| 2007/0152985 A1 | 7/2007 | Ostergaard et al. |
| 2007/0165008 A1 | 7/2007 | Crockett |
| 2007/0176162 A1 | 8/2007 | Kang |
| 2007/0195404 A1 | 8/2007 | Iijima |
| 2007/0201042 A1 | 8/2007 | Eliasson et al. |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0012835 A1 | 1/2008 | Rimon et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1 | 3/2008 | Cornish et al. |
| 2008/0080811 A1 | 4/2008 | Deane |
| 2008/0088603 A1 | 4/2008 | Eliasson et al. |
| 2008/0115081 A1 | 5/2008 | Sankaravadivelu et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0198144 A1* | 8/2008 | Shimizu ............. G06F 3/0421 345/175 |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |

(56) References Cited

U.S. PATENT DOCUMENTS

| | | |
|---|---|---|
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0297998 A1 | 12/2008 | Choi |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058832 A1* | 3/2009 | Newton ............... G06F 3/0421 345/175 |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0127005 A1 | 5/2009 | Zachut et al. |
| 2009/0128499 A1 | 5/2009 | Izadi et al. |
| 2009/0128508 A1* | 5/2009 | Sohn .................... G06F 3/0421 345/173 |
| 2009/0135162 A1* | 5/2009 | Van De Wijdeven ........................ G06F 3/04883 345/175 |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2009/0297009 A1 | 12/2009 | Xu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0038545 A1 | 2/2010 | Cavallucci et al. |
| 2010/0045629 A1 | 2/2010 | Newton |
| 2010/0045634 A1 | 2/2010 | Su et al. |
| 2010/0057235 A1 | 3/2010 | Wang et al. |
| 2010/0059295 A1 | 3/2010 | Hotelling et al. |
| 2010/0060896 A1 | 3/2010 | Van De Wijdeven et al. |
| 2010/0066016 A1* | 3/2010 | Van De Wijdeven ........................ G06F 3/0421 273/237 |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0133409 A1 | 6/2010 | Park et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0193259 A1 | 8/2010 | Wassvik |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0321341 A1 | 12/2010 | Cho et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0050649 A1 | 3/2011 | Newton et al. |
| 2011/0051394 A1 | 3/2011 | Bailey |
| 2011/0057102 A1 | 3/2011 | Yao |
| 2011/0065424 A1 | 3/2011 | Estevez et al. |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102320 A1 | 5/2011 | Hauke et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |

(56) References Cited

U.S. PATENT DOCUMENTS

| | | |
|---|---|---|
| 2011/0169756 A1 | 7/2011 | Ogawa et al. |
| 2011/0169780 A1 | 7/2011 | Goertz et al. |
| 2011/0175852 A1* | 7/2011 | Goertz .................. G06F 3/0428 345/175 |
| 2011/0181552 A1 | 7/2011 | Goertz et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0210946 A1 | 9/2011 | Goertz et al. |
| 2011/0216042 A1 | 9/2011 | Wassvik et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0261020 A1 | 10/2011 | Song et al. |
| 2011/0266423 A1 | 11/2011 | Koeppe et al. |
| 2011/0267264 A1 | 11/2011 | Mccarthy et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0291989 A1 | 12/2011 | Lee |
| 2011/0298743 A1 | 12/2011 | Machida et al. |
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Chang et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown Elliott |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0139866 A1 | 6/2012 | Jung et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0146957 A1 | 6/2012 | Dunagan |
| 2012/0153134 A1* | 6/2012 | Bergstrom ............ G06F 3/0423 250/221 |
| 2012/0154338 A1 | 6/2012 | Bergström et al. |
| 2012/0154339 A1 | 6/2012 | Land et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0170056 A1 | 7/2012 | Jakobsen et al. |
| 2012/0173343 A1 | 7/2012 | Koning |
| 2012/0176328 A1 | 7/2012 | Brown et al. |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1* | 7/2012 | Jansson .................. G06F 3/042 345/175 |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0206375 A1 | 8/2012 | Fyke et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1* | 8/2012 | Drumm ............... G06F 3/04166 345/175 |
| 2012/0221715 A1 | 8/2012 | Hamada |
| 2012/0223916 A1 | 9/2012 | Kukulj |
| 2012/0235892 A1 | 9/2012 | Narendra et al. |
| 2012/0235955 A1 | 9/2012 | Ng et al. |
| 2012/0242622 A1 | 9/2012 | Tseng et al. |
| 2012/0249477 A1 | 10/2012 | Popovich et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0305755 A1 | 12/2012 | Hong et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0016059 A1 | 1/2013 | Lowles et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127765 A1 | 5/2013 | Behdasht et al. |
| 2013/0127790 A1* | 5/2013 | Wassvik ............... G06F 3/0428 345/175 |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1 | 6/2013 | Holmgren et al. |
| 2013/0141397 A1 | 6/2013 | Dunagan |
| 2013/0154983 A1 | 6/2013 | Christiansson et al. |
| 2013/0155027 A1* | 6/2013 | Holmgren ............... G06F 1/169 345/175 |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1* | 7/2013 | Eriksson ............... G06F 1/1616 345/175 |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |

(56) References Cited

U.S. PATENT DOCUMENTS

| | | |
|---|---|---|
| 2013/0249833 A1 | 9/2013 | Christiansson et al. |
| 2013/0250354 A1 | 9/2013 | Kato et al. |
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0285977 A1 | 10/2013 | Baharav et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2013/0342490 A1 | 12/2013 | Wallander et al. |
| 2014/0002400 A1 | 1/2014 | Christiansson et al. |
| 2014/0009430 A1 | 1/2014 | Italia et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0125633 A1 | 5/2014 | Fåhraeus et al. |
| 2014/0139467 A1 | 5/2014 | Ghosh et al. |
| 2014/0149880 A1 | 5/2014 | Farouki |
| 2014/0152624 A1* | 6/2014 | Piot ................. G06F 3/0421 345/175 |
| 2014/0160762 A1 | 6/2014 | Dudik et al. |
| 2014/0168153 A1 | 6/2014 | Deichmann et al. |
| 2014/0192023 A1 | 7/2014 | Hoffman |
| 2014/0204036 A1 | 7/2014 | Schillings et al. |
| 2014/0210793 A1* | 7/2014 | Eriksson ............. F24C 7/086 345/175 |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0267147 A1 | 9/2014 | Buelow et al. |
| 2014/0292690 A1 | 10/2014 | Sugihara |
| 2014/0292699 A1 | 10/2014 | Ando |
| 2014/0292701 A1 | 10/2014 | Christiansson et al. |
| 2014/0300572 A1 | 10/2014 | Ohlsson et al. |
| 2014/0320459 A1* | 10/2014 | Pettersson ........... G06F 3/04166 345/175 |
| 2014/0320460 A1 | 10/2014 | Johansson et al. |
| 2014/0324953 A1 | 10/2014 | Seo et al. |
| 2014/0334767 A1 | 11/2014 | Lim et al. |
| 2014/0347325 A1 | 11/2014 | Wallander et al. |
| 2014/0362046 A1 | 12/2014 | Yoshida |
| 2014/0362053 A1 | 12/2014 | Holmgren et al. |
| 2014/0362404 A1 | 12/2014 | Miyasaka |
| 2014/0367873 A1 | 12/2014 | Yang et al. |
| 2014/0368471 A1 | 12/2014 | Christiansson et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0083891 A1 | 3/2015 | Wallander |
| 2015/0091832 A1 | 4/2015 | Mizunuma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0130769 A1 | 5/2015 | Björklund |
| 2015/0131010 A1 | 5/2015 | Sugiyama |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0205439 A1 | 7/2015 | Xu et al. |
| 2015/0205441 A1 | 7/2015 | Bergström et al. |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277636 A1 | 10/2015 | Holmgren et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0293600 A1 | 10/2015 | Sears |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0317036 A1 | 11/2015 | Johansson et al. |
| 2015/0324028 A1 | 11/2015 | Wassvik et al. |
| 2015/0325848 A1 | 11/2015 | Yamashita et al. |
| 2015/0331461 A1* | 11/2015 | Delano ................. G21K 5/02 250/503.1 |
| 2015/0331544 A1* | 11/2015 | Bergstrom ........... G02B 6/0088 345/175 |
| 2015/0331545 A1* | 11/2015 | Wassvik ............... G06F 3/042 345/173 |
| 2015/0331546 A1* | 11/2015 | Craven-Bartle ......... G02B 5/00 345/175 |
| 2015/0331547 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0346911 A1 | 12/2015 | Christiansson |

(56) References Cited

U.S. PATENT DOCUMENTS

| | | |
|---|---|---|
| 2015/0363041 A1 | 12/2015 | Zeliff et al. |
| 2015/0363042 A1 | 12/2015 | Krus et al. |
| 2015/0373864 A1 | 12/2015 | Jung |
| 2015/0378466 A1 | 12/2015 | Emery et al. |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0026337 A1 | 1/2016 | Wassvik et al. |
| 2016/0034099 A1 | 2/2016 | Christiansson et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1 | 3/2016 | Kawakubo |
| 2016/0070415 A1 | 3/2016 | Christiansson et al. |
| 2016/0070416 A1 | 3/2016 | Wassvik |
| 2016/0077616 A1 | 3/2016 | Durojaiye et al. |
| 2016/0092021 A1 | 3/2016 | Tu et al. |
| 2016/0098148 A1 | 4/2016 | Gandra et al. |
| 2016/0098152 A1 | 4/2016 | Drumm et al. |
| 2016/0103026 A1 | 4/2016 | Povazay et al. |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0147375 A1 | 5/2016 | Bok et al. |
| 2016/0154532 A1 | 6/2016 | Campbell |
| 2016/0154533 A1 | 6/2016 | Eriksson et al. |
| 2016/0179261 A1* | 6/2016 | Drumm ............... G06F 3/042 345/175 |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0224144 A1 | 8/2016 | Klinghult et al. |
| 2016/0227381 A1 | 8/2016 | Bargetzi et al. |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0031516 A1 | 2/2017 | Sugiyama et al. |
| 2017/0060346 A1 | 3/2017 | Park et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0090090 A1 | 3/2017 | Craven-Bartle et al. |
| 2017/0090598 A1 | 3/2017 | Morrison et al. |
| 2017/0094224 A1 | 3/2017 | Hasegawa et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0123257 A1 | 5/2017 | Zhao |
| 2017/0131846 A1 | 5/2017 | Huitema |
| 2017/0139541 A1 | 5/2017 | Christiansson et al. |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0177163 A1 | 6/2017 | Wallander et al. |
| 2017/0185186 A1 | 6/2017 | Liu |
| 2017/0185230 A1 | 6/2017 | Wallander et al. |
| 2017/0185269 A1 | 6/2017 | Anttila et al. |
| 2017/0192493 A1 | 7/2017 | Ofek et al. |
| 2017/0192596 A1 | 7/2017 | Lee et al. |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1 | 8/2017 | Poon et al. |
| 2017/0249030 A1 | 8/2017 | Park et al. |
| 2017/0255337 A1 | 9/2017 | Drumm |
| 2017/0264865 A1 | 9/2017 | Huangfu |
| 2017/0277355 A1 | 9/2017 | Kang |
| 2017/0285789 A1 | 10/2017 | Barel |
| 2017/0308236 A1 | 10/2017 | Lee |
| 2017/0318115 A1 | 11/2017 | Peng et al. |
| 2017/0336891 A1 | 11/2017 | Rosenberg et al. |
| 2017/0344185 A1 | 11/2017 | Ohlsson et al. |
| 2018/0018061 A1 | 1/2018 | Christiansson et al. |
| 2018/0031753 A1 | 2/2018 | Craven-Bartle et al. |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0106692 A1 | 4/2018 | Ciocarlie et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0129354 A1 | 5/2018 | Christiansson et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0203557 A1 | 7/2018 | Kim |
| 2018/0204877 A1* | 7/2018 | Jalili ............... H01L 21/76841 |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0263130 A1 | 9/2018 | Curran et al. |
| 2018/0267672 A1* | 9/2018 | Wassvik ............... G06F 3/0428 |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2018/0275836 A1 | 9/2018 | Hermans et al. |
| 2018/0279454 A1* | 9/2018 | Takeshita ........... G03B 21/2066 |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2018/0356940 A1* | 12/2018 | Christiansson ....... G06F 3/0421 |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0079638 A1 | 3/2019 | Kocovski et al. |
| 2019/0094990 A1 | 3/2019 | Fahraeus et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196659 A1 | 6/2019 | Skagmo et al. |
| 2019/0196660 A1 | 6/2019 | Skagmo et al. |
| 2019/0227670 A1 | 7/2019 | O'Cleirigh et al. |
| 2019/0235665 A1 | 8/2019 | Kim et al. |
| 2019/0235701 A1 | 8/2019 | Han et al. |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1 | 8/2019 | Baba |
| 2019/0272052 A1 | 9/2019 | Wallander et al. |
| 2019/0317640 A1* | 10/2019 | Christiansson ....... G06F 3/0421 |
| 2019/0324570 A1 | 10/2019 | Kolundzjia et al. |
| 2019/0377431 A1 | 12/2019 | Drumm |
| 2019/0377435 A1 | 12/2019 | Piot et al. |
| 2020/0001645 A1 | 1/2020 | Yano et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0064966 A1 | 2/2020 | Kocovski et al. |
| 2020/0073509 A1 | 3/2020 | Shih et al. |

(56) References Cited

U.S. PATENT DOCUMENTS

| | | | |
|---|---|---|---|
| 2020/0096854 A1 | 3/2020 | Schiavoni et al. | |
| 2020/0098147 A1 | 3/2020 | Ha et al. | |
| 2020/0110508 A1 | 4/2020 | Kocovski et al. | |
| 2020/0125189 A1 | 4/2020 | Kim et al. | |
| 2020/0150822 A1 | 5/2020 | Christiansson et al. | |
| 2020/0159382 A1 | 5/2020 | Drumm | |
| 2020/0167033 A1 | 5/2020 | Kim et al. | |
| 2020/0173050 A1* | 6/2020 | Curran | H05K 5/04 |
| 2020/0174644 A1 | 6/2020 | Weibull et al. | |
| 2020/0177742 A1 | 6/2020 | Homma et al. | |
| 2020/0201479 A1 | 6/2020 | Wassvik et al. | |
| 2020/0225807 A1 | 7/2020 | Skagmo et al. | |
| 2020/0249777 A1 | 8/2020 | Hou et al. | |
| 2020/0257405 A1* | 8/2020 | Bergström | G06F 3/0428 |
| 2020/0293136 A1 | 9/2020 | Jakobson et al. | |
| 2020/0310592 A1* | 10/2020 | Bergström | G06F 3/0421 |
| 2020/0310621 A1 | 10/2020 | Piot et al. | |
| 2020/0337173 A1 | 10/2020 | Wang et al. | |
| 2020/0341587 A1 | 10/2020 | Drumm | |
| 2020/0348473 A1 | 11/2020 | Drumm | |
| 2020/0348817 A1 | 11/2020 | Ohlsson et al. | |
| 2020/0387237 A1 | 12/2020 | Drumm | |
| 2020/0393935 A1 | 12/2020 | Christiansson et al. | |
| 2020/0401270 A1* | 12/2020 | Bergström | G02B 6/4206 |
| 2021/0013496 A1 | 1/2021 | Tsuzuki et al. | |
| 2021/0026466 A1 | 1/2021 | Andersson et al. | |
| 2021/0026587 A1 | 1/2021 | Christiansson et al. | |
| 2021/0041970 A1* | 2/2021 | Bergström | G06F 3/042 |
| 2021/0050086 A1 | 2/2021 | Rose et al. | |
| 2021/0055825 A1 | 2/2021 | Christiansson et al. | |
| 2021/0081071 A1 | 3/2021 | Koh et al. | |
| 2021/0089164 A1 | 3/2021 | Christiansson et al. | |
| 2021/0096604 A1* | 4/2021 | Curran | G02B 5/223 |
| 2021/0096691 A1 | 4/2021 | Skagmo et al. | |
| 2021/0103356 A1 | 4/2021 | Christiansson et al. | |
| 2021/0173514 A1 | 6/2021 | Kocovski et al. | |
| 2021/0173515 A1 | 6/2021 | Skagmo et al. | |
| 2021/0255662 A1 | 8/2021 | Svensson et al. | |
| 2021/0286464 A1 | 9/2021 | Kocovski et al. | |
| 2021/0352120 A1 | 11/2021 | Masi et al. | |
| 2022/0035481 A1 | 2/2022 | Bergstrm et al. | |
| 2022/0100313 A1 | 3/2022 | Holmgren | |
| 2022/0109809 A1 | 4/2022 | Wassvik et al. | |
| 2022/0221955 A1* | 7/2022 | Bergström | G06F 3/04182 |
| 2022/0236828 A1 | 7/2022 | Skagmo et al. | |
| 2022/0291774 A1 | 9/2022 | Bergström et al. | |
| 2022/0413652 A1 | 12/2022 | Andersson et al. | |
| 2023/0009306 A1 | 1/2023 | Andreasson | |
| 2023/0057020 A1 | 2/2023 | Wassvik | |
| 2023/0068643 A1 | 3/2023 | Bergstrom et al. | |
| 2023/0080260 A1 | 3/2023 | Bergstrom et al. | |
| 2023/0082401 A1 | 3/2023 | Andreasson et al. | |
| 2023/0168774 A1 | 6/2023 | Kocovski et al. | |
| 2023/0168775 A1 | 6/2023 | Skagmo et al. | |
| 2023/0315234 A1 | 10/2023 | Kocovski et al. | |
| 2023/0359309 A1 | 11/2023 | Bergström et al. | |
| 2023/0393692 A1 | 12/2023 | Krus | |
| 2023/0400948 A1 | 12/2023 | Bergström et al. | |
| 2024/0004501 A1 | 1/2024 | Bergström et al. | |
| 2024/0111367 A1 | 4/2024 | Wassvik et al. | |
| 2024/0248565 A1 | 7/2024 | Bergstrom et al. | |
| 2024/0280847 A1 | 8/2024 | Kocovski et al. | |
| 2024/0427460 A1 | 12/2024 | Andersson et al. | |
| 2025/0060930 A1 | 2/2025 | Berglund et al. | |

FOREIGN PATENT DOCUMENTS

| | | |
|---|---|---|
| CA | 2745422 A1 | 6/2010 |
| CN | 1794157 A | 6/2006 |
| CN | 201233592 Y | 5/2009 |
| CN | 101174191 A | 6/2009 |
| CN | 101644854 A | 2/2010 |
| CN | 201437963 U | 4/2010 |
| CN | 201465071 U | 5/2010 |
| CN | 101882034 | 11/2010 |
| CN | 102117155 A | 7/2011 |
| CN | 101019071 B | 6/2012 |
| CN | 101206550 B | 6/2012 |
| CN | 102929449 A | 2/2013 |
| CN | 202887145 U | 4/2013 |
| CN | 103123556 A | 5/2013 |
| CN | 203189466 U | 9/2013 |
| CN | 203224848 U | 10/2013 |
| CN | 203453994 U | 2/2014 |
| CN | 101075168 B | 4/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 204288179 U | 4/2015 |
| CN | 104808843 A | 7/2015 |
| CN | 204695282 U | 10/2015 |
| CN | 105183241 A | 12/2015 |
| CN | 205015574 U | 2/2016 |
| CN | 205384833 U | 7/2016 |
| CN | 106648222 A | 5/2017 |
| CN | 206400503 U | 8/2017 |
| CN | 104391611 A | 9/2017 |
| CN | 108345414 A | 7/2018 |
| CN | 105320382 B | 4/2021 |
| CN | 113010053 A | 6/2021 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |
| DE | 102010000473 A1 | 8/2010 |
| EP | 0845812 B1 | 6/1998 |
| EP | 0600576 B1 | 10/1998 |
| EP | 0931731 A1 | 7/1999 |
| EP | 1471459 A2 | 10/2004 |
| EP | 1798630 A2 | 6/2007 |
| EP | 1835464 A1 | 9/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2325735 A2 | 5/2011 |
| EP | 2339437 A3 | 10/2011 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 1457870 B1 | 8/2012 |
| EP | 2565770 A2 | 3/2013 |
| EP | 2765622 A2 | 8/2014 |
| EP | 2778849 A1 | 9/2014 |
| EP | 2797143 A1 | 10/2014 |
| EP | 2840470 | 2/2015 |
| EP | 2515216 A1 | 3/2016 |
| EP | 3002666 | 4/2016 |
| EP | 3043242 A1 | 7/2016 |
| EP | 3535640 A1 | 9/2019 |
| EP | 3537269 A1 | 9/2019 |
| EP | 3644167 A1 | 4/2020 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| GB | 2263765 A | 8/1993 |
| GB | 2472444 A | 2/2011 |
| JP | S62159213 A | 7/1987 |
| JP | H05190066 A | 7/1993 |
| JP | 11-085399 A | 3/1999 |
| JP | 2000506655 A | 5/2000 |

(56) References Cited

FOREIGN PATENT DOCUMENTS

| | | |
|---|---|---|
| JP | 2000172438 A | 6/2000 |
| JP | 2000-268824 A | 9/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2009-004139 A | 1/2009 |
| JP | 2009-543173 A | 12/2009 |
| JP | 2010-238426 A | 10/2010 |
| JP | 2011530124 A | 12/2011 |
| JP | 2015-038862 A | 2/2015 |
| JP | 2015-049965 A | 3/2015 |
| JP | 2016192688 | 11/2016 |
| JP | 6211595 B2 | 10/2017 |
| JP | 2015158831 A | 2/2018 |
| KR | 10-2001-0060254 A | 7/2001 |
| KR | 100359400 | 7/2001 |
| KR | 100940435 | 2/2010 |
| KR | 101081586 B1 | 11/2011 |
| KR | 10-1319543 B1 | 10/2013 |
| KR | 20150125374 A | 11/2015 |
| KR | 10-2016-0075643 A | 6/2016 |
| KR | 10-1933889 B1 | 12/2018 |
| NL | 2019782 B1 | 4/2019 |
| TW | M517370 U | 2/2016 |
| WO | WO 1984/003186 A1 | 8/1984 |
| WO | WO 95/27919 A2 | 10/1995 |
| WO | 96/10148 A1 | 4/1996 |
| WO | 96/23649 A1 | 8/1996 |
| WO | WO 1999/046602 A1 | 9/1999 |
| WO | 00/50807 A1 | 8/2000 |
| WO | 01/20781 A1 | 3/2001 |
| WO | 01/27867 A1 | 4/2001 |
| WO | WO 01/127867 A1 | 4/2001 |
| WO | 01/71654 A1 | 9/2001 |
| WO | WO 01/84251 A2 | 11/2001 |
| WO | 02/07072 A2 | 1/2002 |
| WO | WO 02/35460 A1 | 5/2002 |
| WO | WO 02/077915 A2 | 10/2002 |
| WO | WO 02/095668 A1 | 11/2002 |
| WO | 03/41006 A1 | 5/2003 |
| WO | WO 03/076870 A1 | 9/2003 |
| WO | WO 2004/032210 A2 | 4/2004 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | 2006/003245 A1 | 1/2006 |
| WO | WO 2006/081633 A1 | 8/2006 |
| WO | WO 2006/095320 A2 | 9/2006 |
| WO | WO 2006/124551 A2 | 11/2006 |
| WO | WO 2007/003196 A2 | 1/2007 |
| WO | WO 2007/047685 A2 | 4/2007 |
| WO | WO 2007/058924 A2 | 5/2007 |
| WO | WO 2007/112742 A1 | 10/2007 |
| WO | 2008/004097 A2 | 1/2008 |
| WO | 2008/007372 A2 | 1/2008 |
| WO | WO 2008/004103 A2 | 1/2008 |
| WO | WO 2008/007276 A2 | 1/2008 |
| WO | WO 2008/017077 A2 | 2/2008 |
| WO | 2008/032270 A2 | 3/2008 |
| WO | WO 2008/034184 A1 | 3/2008 |
| WO | 2008/038066 A2 | 4/2008 |
| WO | WO 2008/039006 A1 | 4/2008 |
| WO | WO 2008/044024 | 4/2008 |
| WO | WO 2008/068607 A2 | 6/2008 |
| WO | WO 2006/124551 B1 | 7/2008 |
| WO | 2009/000289 A1 | 12/2008 |
| WO | 2009/007704 A1 | 1/2009 |
| WO | WO 2008/017077 A4 | 2/2009 |
| WO | WO 2009029764 A1 | 3/2009 |
| WO | WO 2009/048365 A1 | 4/2009 |
| WO | WO 2009/077962 A2 | 6/2009 |
| WO | WO 2009/102681 A2 | 8/2009 |
| WO | 2009/135320 A1 | 11/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | 2010/015410 A2 | 2/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | 2011/031215 A1 | 3/2011 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | 2011/104673 A1 | 9/2011 |
| WO | 2011/119483 A1 | 9/2011 |
| WO | WO 2011/139213 A1 | 11/2011 |
| WO | 2012/005051 A1 | 1/2012 |
| WO | 2012/012165 A1 | 1/2012 |
| WO | WO 2012/002894 A1 | 1/2012 |
| WO | WO 2012/010078 A1 | 1/2012 |
| WO | 2012/015810 A2 | 2/2012 |
| WO | WO 2012/018176 A2 | 2/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/171181 | 12/2012 |
| WO | WO 2012/172302 A1 | 12/2012 |
| WO | WO 2012/176801 A1 | 12/2012 |
| WO | 2013/011571 A1 | 1/2013 |
| WO | 2013/014534 A2 | 1/2013 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | 2013/081818 A1 | 6/2013 |
| WO | WO 2013/089622 A2 | 6/2013 |
| WO | 2013/108031 A2 | 7/2013 |
| WO | 2013/126005 A2 | 8/2013 |
| WO | WO 2013/115710 A2 | 8/2013 |
| WO | 2013/138003 A1 | 9/2013 |
| WO | WO 2013/133756 A1 | 9/2013 |
| WO | WO 2013/133757 A2 | 9/2013 |
| WO | 2013/095271 A3 | 10/2013 |
| WO | WO 2013/159472 | 10/2013 |
| WO | 2013/165305 A2 | 11/2013 |
| WO | 2013/165306 A2 | 11/2013 |
| WO | WO 2013/176613 A2 | 11/2013 |
| WO | WO 2013/176614 A2 | 11/2013 |
| WO | WO 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | 2014/027241 A2 | 2/2014 |
| WO | 2014/037963 A1 | 3/2014 |
| WO | WO 2014/044181 A1 | 3/2014 |
| WO | WO 2014/055809 A1 | 4/2014 |
| WO | 2014/042576 A3 | 5/2014 |
| WO | WO 2014/065601 | 5/2014 |
| WO | 2014/085726 A2 | 6/2014 |
| WO | 2014/093937 A1 | 6/2014 |
| WO | 2014/098740 A1 | 6/2014 |
| WO | 2014/098741 A1 | 6/2014 |
| WO | 2014/098743 A1 | 6/2014 |

(56) References Cited

FOREIGN PATENT DOCUMENTS

| | | |
|---|---|---|
| WO | WO 2014/086084 A1 | 6/2014 |
| WO | WO 2014/098742 | 6/2014 |
| WO | WO 2014/098744 A1 | 6/2014 |
| WO | WO 2014/104967 A1 | 7/2014 |
| WO | WO 2014/130515 | 8/2014 |
| WO | WO 2014/131221 | 9/2014 |
| WO | 2014/168567 A1 | 10/2014 |
| WO | 2014/168568 A1 | 10/2014 |
| WO | 2014/168569 A1 | 10/2014 |
| WO | 2015/005847 A1 | 1/2015 |
| WO | 2015/029350 A1 | 3/2015 |
| WO | 2015/076731 A1 | 5/2015 |
| WO | 2015/084644 A1 | 6/2015 |
| WO | 2015/108477 A1 | 7/2015 |
| WO | 2015/108479 A1 | 7/2015 |
| WO | 2015/108480 A1 | 7/2015 |
| WO | WO 2015/123322 A1 | 8/2015 |
| WO | 2015/108478 A3 | 11/2015 |
| WO | WO 2015/175586 A1 | 11/2015 |
| WO | 2015/199602 A1 | 12/2015 |
| WO | 2016/122385 A1 | 8/2016 |
| WO | WO 2016/130074 A1 | 8/2016 |
| WO | 2016/140612 A1 | 9/2016 |
| WO | 2016/160745 A1 | 10/2016 |
| WO | 2016/177592 A1 | 11/2016 |
| WO | 2017/026821 A1 | 2/2017 |
| WO | WO 2017/099657 | 6/2017 |
| WO | 2017/138863 A1 | 8/2017 |
| WO | 2018/003929 A1 | 1/2018 |
| WO | 2018/090060 A1 | 5/2018 |
| WO | WO 2018/096430 A1 | 5/2018 |
| WO | WO 2018/106172 A1 | 6/2018 |
| WO | WO 2018/106176 | 6/2018 |
| WO | 2018/147782 A1 | 8/2018 |
| WO | WO 2018/141948 | 8/2018 |
| WO | 2018/182476 A1 | 10/2018 |
| WO | 2019/032014 A1 | 2/2019 |
| WO | 2019/039984 A1 | 2/2019 |
| WO | 2019/050459 A1 | 3/2019 |
| WO | WO 2019/045629 | 3/2019 |
| WO | WO 2019/156609 | 8/2019 |
| WO | 2019/172829 A1 | 9/2019 |
| WO | 2019/177515 A1 | 9/2019 |
| WO | WO 2019/172826 | 9/2019 |
| WO | WO 2019/172827 | 9/2019 |
| WO | 2019/187537 A1 | 10/2019 |
| WO | WO 2020/022096 | 1/2020 |
| WO | 2020/078339 A1 | 4/2020 |
| WO | 2020/078749 A1 | 4/2020 |
| WO | 2020/080992 A1 | 4/2020 |
| WO | 2020/153890 A1 | 7/2020 |
| WO | 2020/168802 A1 | 8/2020 |
| WO | 2020/236072 A1 | 11/2020 |
| WO | 2021/107840 A1 | 6/2021 |
| WO | 2021/112754 A1 | 6/2021 |
| WO | 2021/158164 A1 | 8/2021 |
| WO | 2021/158167 A1 | 8/2021 |
| WO | 2021/162602 A1 | 8/2021 |
| WO | 2022/086396 A1 | 4/2022 |
| WO | 2022/108508 A1 | 5/2022 |
| WO | 2022/173353 A1 | 8/2022 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

International Search Report for International App. No. PCT/SE2017/050102, dated Apr. 5, 2017, in 4 pages.

Johnson, M., "Enhanced Optical Touch Input Panel", IBM Technical Disclosure Bulletin, 1985, in 3 pages.

Kak, et al., "Principles of Computerized Tomographic Imaging", Institute of Electrical Engineers, Inc., 1999, in 333 pages.

Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, Jun. 2011, vol. 13, No. 3, ISSN: 1520-9210.

The Laser Wall, MIT, 1997, http://web.media.mit.edu/joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Machine translation of KR10-2016-0075643 (Year: 2017).

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

Supplementary European Search Report for European App. No. EP 16759213, dated Oct. 4, 2018, in 9 pages.

Extended European Search Report for European App. No. 16743795.3, dated Sep. 11, 2018, in 5 pages.

International Search Report for International App. No. PCT/SE2017/051224, dated Feb. 23, 2018, in 5 pages.

International Search Report for International App. No. PCT/IB2017/057201, dated Mar. 6, 2018, in 4 pages.

Extended European Search Report in European Application No. 19165019.1, dated Jul. 18, 2019 in 8 pages.

International Preliminary Report on Patentability received in International Application No. PCT/SE2017/051233, dated Jun. 11, 2019, in 6 pages.

International Search Report for International App. No. PCT/SE2018/050070, dated Apr. 25, 2018, in 4 pages.

Extended European Search Report in European Application No. 17750516.1, dated Jul. 16, 2019 in 5 pages.

Extended European Search Report in European Application No. 16873465.5, date Jun. 25, 2019 in 9 pages.

Extended European Search Report for European App. No. 18772370.5, dated Dec. 9, 2020, in 8 pages.

Extended European Search Report for European App. No. 18772178.2, dated Dec. 10, 2020, in 8 pages.

Extended European Search Report for European App. No. 18774232.5, dated Dec. 21, 2020, in 9 pages.

ASTM International, "Standard Specification for Heat-Treated Flat Glass-Kind HS, Kind FT Coated and Uncoated Glass," Designation: C 1048-04, in 7 pages.

British Standard, "Glass in building—Thermally toughened soda lime silicate safety glass," EN 12150-1:2000, ISBN 0 580 36171 3, Aug. 15, 2000, in 28 pages.

International Search Report in PCT/SE2019/050189 dated May 29, 2019 in 4 pages.

International Search Report for International App. No. PCT/SE2020/050043, dated Feb. 24, 2020, in 3 pages.

International Search Report for International App. No. PCT/SE2020/050504, dated Apr. 9, 2020, in 4 pages.

International Search Report in App. No. PCT/SE2020/051117 dated Feb. 5, 2021 in 2 pages.

International Search Report in International Application No. PCT/SE2021/050040 dated May 10, 2021 in 3 pages.

(56) References Cited

OTHER PUBLICATIONS

International Search Report in International App. No. PCT/SE2021/050086 dated Feb. 26, 2021 in 5 pages.
International Search Report in International Application No. PCT/SE2021/050095 dated Jun. 2, 2021 in 6 pages.
Civil Cover Sheet *Flatfrog Laboratories AB v. Promethean Ltd. and Promethean Inc.*, dated Dec. 10, 2019, in 1 page.
Communication pursuant to Article 94(3) in EP Application No. 20816652.0 dated Feb. 16, 2024.
Complaint for Patent Infringement, *Flatfrog Laboratories AB v. Promethean Ltd. and Promethean Inc.*, C.A. No. 19-2246, dated Dec. 10, 2019, in 83 pages.
Defendants Promethean Ltd. and Promethean Inc.'s Preliminary Proposed Claim Constructions, *Flatfrog Laboratories AB v. Promethean Ltd. and Promethean Inc.*, C.A. No. 1:19-cv-02246-MN, dated May 24, 2021, in 8 pages.
Defendants' Sur-Reply Claim Construction Brief, Flatfrog *Flatfrog Laboratories AB v. Promethean Ltd. and Promethean Inc.*, C.A. No. 1:19-cv-02246-MN, dated Sep. 13, 2021, in 24 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Defendants' Initial Invalidity Contentions, *Flatfrog Laboratories AB v. Promethean Ltd. and Promethean Inc.*, C.A. No. 1:19-cv-02246-MN, dated Apr. 23, 2021, in 26 pages.
Executed Summons in a Civil Action to Promethean Inc., C.A. No. 19-2246, dated Dec. 10, 2019 in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 43 pages.
Exhibit 10: Invalidity Claim Chart Against U.S. Pat. No. 10,739,916 Based on International App. Pub. No. WO2014131221 to Chen et al., *Flatfrog Laboratories AB v. Promethean Ltd. and Promethean Inc.*, C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *Flatfrog Laboratories AB v. Promethean Ltd. and Promethean Inc.*, C.A. No. 1:19- cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *Flatfrog Laboratories AB v. Promethean Ltd. and Promethean Inc.*, C.A. No. 1:19- cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *Flatfrog Laboratories AB v. Promethean Ltd. and Promethean Inc.*, C.A. No. 1:19-cv-02246-MN, dated Apr. 23, 2021, in 4 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB v. Promethean Ltd. and Promethean Inc.*, C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 14 pages.

Exhibit 4B: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C. A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *Flatfrog Laboratories AB v. Promethean Ltd. and Promethean Inc.*, C.A. No. 1:19-cv-02246-MN, dated Apr. 23, 2021, in 4 pages.
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB v. Promethean Ltd. and Promethean Inc.*, C.A. No. 1:19-cv-02246-MN, dated Sep. 20, 2021, in 92 pages.
Machine translation of CN 108345414A (Year: 2018).

(56) References Cited

OTHER PUBLICATIONS

Machine translation of JP 11-85399 (Year: 1999).
Machine translation of KR20160075643A (Year: 2016).
Notice of Service, *Flatfrog Laboratories AB v. Promethean Ltd. and Promethean Inc.*, C.A. No. 1:19-cv-02246-MN, dated Apr. 23, 2021, in 2 pages.
Report on the Filing or Determination of an Action Regarding a Patent or Trademark. For U.S. Pat. No. 10,282,035, U.S. District of Delaware, dated Dec. 10, 2019, in 1 page.
Summons in a Civil Action to Promethean Inc., C.A. No. 19-2246, dated Dec. 10, 2019 in 2 pages.
International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.
International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Search Report and Written Opinion for International App. No. PCT/SE2019/050343, dated Sep. 3, 2019, in 13 pages.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.

(56) References Cited

OTHER PUBLICATIONS

International Search Report and Written Opinion received for PCT Patent Application No. PCT/SE2015/050041, mailed on Apr. 29, 2015, 12 pages.

International Search Report and Written Opinion received for PCT Patent Application No. PCT/SE2015/050042, mailed on Sep. 28, 2015, 14 pages.

International Search Report and Written Opinion received for PCT Patent Application No. PCT/SE2015/050044, mailed on May 19, 2015, 11 pages.

International Search Report and Written Opinion received for PCT Patent Application No. PCT/SE2015/050724, mailed on Oct. 6, 2015, 10 pages.

International Search Report and Written Opinion received for PCT Patent Application No. PCT/SE2016/050053, mailed on May 2, 2016, 16 pages.

International Search Report and Written Opinion received for PCT Patent Application No. PCT/SE2016/050098, mailed on Jun. 29, 2016, 13 pages.

Anderson, R. Rox, B.S., and John A. Parrish, M.D. "The Optics of Human Skin." Journal of Investigative Dermatology 77.1 (1981): 13-19.

Barzilai et al., "Two-Point Step Size Gradient Methods", IMA Journal of Numerical Analysis, 1988, pp. 141-148.

Bose, R, "Strongly regular graphs, partial geometries and partially balanced designs", Pacific J. Math., vol. 13, No. 2 (1963), pp. 389-419.

Chen. Yhun, "Using micro-structures to couple light into thin light-guides," Master of Science Thesis, Stockholm, 2011.

Cornelissen, Hugo J. et al. "Injecting Light of High-Power LEDs into Thin Light Guides." Proc. SPIE 7652. International Optical Design Conference (2010): 7652121-7652126.

Ericson, Chris, "Real-Time Collision Detection", The Morgan Kaufmann Series in Interactive 30 Technology (2005) Chapters 5-9, pp. 125-412.

European Examination Report dated Aug. 3, 2015 issued in corresponding European Application No. 12860074.9.

European Office Action issued in European Patent Application No. 13183545, dated Feb. 12, 2014.

European Search Report dated Apr. 19, 2012 issued in European Application No. 09830665.7.

European Search Report dated Jan. 23, 2014 issued in corresponding European Appln. No. 13183545.6.

European Search Report issued in European Application No. 11777650.0, dated Nov. 22, 2013.

Extended (Supplementary) European Search Report dated Apr. 30, 2021, issued in counterpart EP application No. 19775915.2. (8 pages).

Farghal, et al., "Electromagnetic Modeling of Outcoupling Efficiency and Light Emission In Near-Infrared Quantum Dot Light Emitting Devices", published in Progress In Electromagnetics Research B., vol. 24, 263-284, 2010.

Final Office Action dated Nov. 24, 2017 in U.S. Appl. No. 14/652,757.
Final Office Action issued Nov. 30, 2017 in U.S. Appl. No. 14/652,736.

Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.

Golub et al., "Matrix Computations", Third Edition, The Johns Hopkins University Press, 1996, 716 pages.

Golub et al: "Matrix Norms" in: "Matrix Computations" Aug. 21, 2005 (Aug. 21, 2005), Johns Hopkins University Press, pp. 54-59.s.

Holzammer, Andereas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf*.

Horwood, A. et al: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormali zation.pdf*Paae 9, line 1- Paae 14, line 1*.

International Preliminary Report on Patentability received for PCT Patent Application No. PCT/EP2018/052757, mailed on Aug. 15, 2019, 7 pages.

International Preliminary Report on Patentability received for PCT Patent Application No. PCT/EP2019/077054, mailed on Apr. 29, 2021, 7 pages.

International Preliminary Report on Patentability received for PCT Patent Application No. PCT/IB2017/057201, mailed on Jun. 6, 2019, 8 pages.

International Preliminary Report on Patentability received for PCT Patent Application No. PCT/JP2019/001801, mailed on Oct. 15, 2020, 12 pages (6 pages of English Translation and 6 pages of Original Document).

International Preliminary Report on Patentability received for PCT Patent Application No. PCT/SE2009/051364, mailed on Jun. 16, 2011, 11 pages.

International Preliminary Report on Patentability received for PCT Patent Application No. PCT/SE2011/050520, mailed on Nov. 15, 2012, 6 pages.

International Preliminary Report on Patentability received for PCT Patent Application No. PCT/SE2011/050871, mailed on Jan. 17, 2013, 10 pages.

International Preliminary Report on Patentability received for PCT Patent Application No. PCT/SE2012/050086, mailed on Aug. 15, 2013, 8 pages.

International Preliminary Report on Patentability received for PCT Patent Application No. PCT/SE2012/051419, mailed on Jul. 3, 2014, 6 pages.

International Preliminary Report on Patentability received for PCT Patent Application No. PCT/SE2013/050064, mailed on Aug. 14, 2014, 7 pages.

International Preliminary Report on Patentability received for PCT Patent Application No. PCT/SE2013/050137, mailed on Sep. 4, 2014, 6 pages.

International Preliminary Report on Patentability received for PCT Patent Application No. PCT/SE2013/050473, mailed on Nov. 13, 2014, 8 pages.

International Preliminary Report on Patentability received for PCT Patent Application No. PCT/SE2013/050585, mailed on Dec. 4, 2014, 10 pages.

International Preliminary Report on Patentability received for PCT Patent Application No. PCT/SE2013/051044, mailed on Mar. 26, 2015, 7 pages.

International Preliminary Report on Patentability received for PCT Patent Application No. PCT/SE2013/051533, mailed on Jul. 2, 2015, 8 pages.

International Preliminary Report on Patentability received for PCT Patent Application No. PCT/SE2013/051534, mailed on Jul. 2, 2015, 8 pages.

International Preliminary Report on Patentability received for PCT Patent Application No. PCT/SE2013/051537, mailed on Jul. 2, 2015, 9 pages.

International Preliminary Report on Patentability received for PCT Patent Application No. PCT/SE2014/050435, mailed on Oct. 22, 2015, 8 pages.

International Preliminary Report on Patentability received for PCT Patent Application No. PCT/SE2014/050437, mailed on Oct. 22, 2015, 6 pages.

International Preliminary Report on Patentability received for PCT Patent Application No. PCT/SE2014/050438, mailed on Oct. 22, 2015, 6 pages.

International Preliminary Report on Patentability received for PCT Patent Application No. PCT/SE2014/050701, mailed on Jan. 21, 2016, 8 pages.

International Preliminary Report on Patentability received for PCT Patent Application No. PCT/SE2014/051363, mailed on Jun. 2, 2016, 6 pages.

(56) References Cited

OTHER PUBLICATIONS

International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Preliminary Report on Patentability received for PCT Patent Application No. PCT/SE2016/050155, mailed on Sep. 14, 2017, 7 pages.
Hartig, B, "Using a tablet as a whiteboard in MS Teams", 2020, Retrieved from the Internet: URL: https://www.voutube.com/watch?v=CC4991ivXQO, retrieved on Jun. 28, 2023, see video from 0:34-3:53.
International Search and Report mailed on Sep. 23, 2022 in International Application PCT/SE2022/050575.
International Search Report and Written Opinion in International Application No. PCT/SE2023/050352 dated Jul. 10, 2023.
International Search Report and Written Opinion received in International Application No. PCT/SE2023/050456, mailed Jul. 17, 2023.
International Search Report and Written Opinion received in International Application No. PCT/SE2023/051245 dated Feb. 13, 2024.
Learning and Technology with Frank: Best hardware to use with Microsoft Whiteboard—WACOM, iPad, and Surface, 2021, Retrieved from the Internet: URL: https://www.voutube.com/watch?v=qched3kwhA, retrieved on Jun. 27, 2023, see video from 5:33 to 6:43.
Tholfsen, M, "The New Microsoft Teams Whiteboard 2021 // A fully updated & improved Whiteboard in Teams meetings," 2021, Retrieved from the Internet: URL: https://www.voutube.com/watch?v=vDO- EUZUmiA, retrieved on Mar. 14, 2023, see video from 0:10-0:39.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2019/050953, mailed on Nov. 26, 2019, 14 pages.
International Search Report and Written Opinion received for PCT Patent Application No. PCT/SE2020/051172, mailed on Feb. 4, 2021, 11 pages.
International Search Report and Written Opinion received for PCT Patent Application No. PCT/SE2021/051018, mailed on Feb. 1, 2022, 10 pages.
International Search Report and Written Opinion received for PCT Patent Application No. PCT/SE2021/051151, mailed on Jan. 26, 2022, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report dated Sep. 25, 2015, in connection with SE 1550087-9 filed on Jan. 28, 2015.
International Search Report received for PCT Patent Application No. PCT/SE2015/050087, mailed on May 6, 2015, 4 pages.
International Search Report received for PCT Patent Application No. PCT/SE2018/050871, mailed on Jan. 25, 2019, 5 pages.
International Search Report received for PCT Patent Application No. PCT/SE2020/050043, mailed on Feb. 24, 2020, 5 pages.
International Search Report received for PCT Patent Application No. PCT/SE2021/050086, mailed Feb. 26, 2021, 6 pages.
Japanese Office Action issued in Japanese Patent Applicaiton No. 2011-539479, dated Feb. 25, 2014.
Joseph O'Rourke, "Computational Geometry in C", Second Edition, Cambridge University Press, (1998), pp. 252-264.
Kak, Avinash C. and Malcolm Slaney. Principles of Computerized Tomographic Imaging. New York: IEEE Press, 1988.
Maximilian Karl: "Entwicklung und Bau einer neuartigen Mehrfinger-Touchscreen basierend auf frustrierter Totalreflexion," Landeswettbewerb in Bayern 2008 Jugend Forscht, Apr. 1, 2008.
McBeth, "Randi, the Badly Drawn Horse", Giphy, Online Available at https://giphy.com/stories/randy-the-badly-drawn-horse-258d6753-fb29, retrieved on Aug. 24, 2023, 15 pages.
Mu, Cong et al. "Dielectric multilayer angular filters for coupling LEDs to thin light guides." Proc SPIE 8170 (2011): 817001-1-817001-10.
Non-Final Office Action dated May 4, 2017 in U.S. Appl. No. 14/652,757.
Non-Final Office Action issued Jun. 14, 2018 in U.S. Appl. No. 14/652,757.
Non-Final Office Action issued Jun. 20, 2018 in U.S. Appl. No. 14/652,736.
Non-Final Office Action issued Mar. 23, 2017 in U.S. Appl. No. 14/652,736.
Office Action dated Aug. 13, 2015, in connection with Sweden Application No. 1550096-0, filed Jan. 30, 2015.
Panzer, et al., "Tunable Infrared Emission From Printed Colloidal Quantum Dot/Polymer Composite Films on Flexible Substrates", published in Journal of Display Technology, vol. 6, No. 3, Mar. 2010.
Press et al., "Numerical Recipes the Art of Scientific Computing", Third Edition, Cambridge University Press, 2007, pp. 1-1235.
Scheuplein, Robert J., Ph.D. "A Survey of Some Fundamental Aspects of the Absorption and Reflection of Light by Tissue." J. Soc. Cos. Chem. 15 (1964): 111-122.
Supplemental ESR dated Aug. 27, 2015 issued in corresponding EP Appin No. 13752508.
Supplementary European Search Report dated Aug. 14, 2015 issued in corresponding European Application No. 13744212.
Supplementary European Search Report for European App. No. EP 13752508, dated Aug. 27, 2015.
Supplementary European Search Report for European App. No. EP 16749542, dated Sep. 17, 2018, in 9 pages.

(56) References Cited

OTHER PUBLICATIONS

Swedish Search Report dated Dec. 22, 2014 issued in corresponding Swedish Application No. 1450651-3.
Swedish Search Report dated Dec. 11, 2013 issued in corresponding Swedish Application No. 1350181-2.
Thomas, G.L et al., "Some observations on fingerprint deposits." J. Phys. D: Appl. Phys. 8 (1975): 724-729.
Tympanus/Codrops | Animated Mesh Lines, posted on Jan. 8, 2019 by Jeremie Boulay, © Codrops 2020 [online], [site visited Oct. 13, 2020], Available from Internet, <URL: https://tympanus.net/codrops/2019/01/08/animated-mesh-lines/>.

* cited by examiner

DETECTION LINE BROADENING

TECHNICAL FIELD

The present disclosure pertains to touch-sensing apparatus that operate by propagating light above a panel. More specifically, it pertains to optical and mechanical solutions for controlling and tailoring the light paths above the panel via fully or partially randomized refraction, reflection or scattering.

BACKGROUND ART

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. I.e. a grid of intersecting light paths are created above the touch surface, also referred to as scanlines. An object that touches the touch surface will attenuate the light on one or more scanlines of the light and cause a change in the light received by one or more of the detectors. The location (coordinates), shape or area of the object may be determined by analyzing the received light at the detectors.

Previous above surface touch technology has problems with detectability, accuracy, jitter and object size classification, related to suboptimal scanline width, component count and touch decoding. The width of the scanlines affects touch performance factors such as detectability, accuracy, resolution, the presence of reconstruction artefacts. Problems with previous prior art touch detection systems relate to suboptimal performance with respect to the aforementioned factors. Some prior art systems aim to improve the accuracy in detecting small objects. This in turn may require incorporating more complex and expensive opto-mechanical modifications to the touch system, such as increasing the number of emitters and detectors, to try to compensate for such losses. This results in a more expensive and less compact system. Furthermore, to reduce system cost, it may be desirable to minimize the number of electro-optical components.

SUMMARY

According to a first aspect, a touch sensing apparatus is provided comprising: a panel that defines a touch surface, a plurality of emitters and detectors arranged along a perimeter of the panel, a light directing arrangement arranged adjacent the perimeter, wherein the emitters are arranged to emit a respective beam of emitted light and the light directing arrangement is arranged to direct the light along a light path from the emitters to the touch surface, wherein the light directing arrangement comprises a diffusive light scattering element arranged in the light path.

Some examples of the disclosure provide for a touch sensing apparatus wherein the light directing arrangement comprises a light guide component and wherein the emitted light enters the light guide component at a first surface and exits the light guide component at a second surface.

Some examples of the disclosure provide for a touch sensing apparatus wherein the diffusive light scattering element is a reflective diffusor and is arranged at a surface of the light guide component to diffuse light travelling in the light guide component.

Some examples of the disclosure provide for a touch sensing apparatus wherein the diffusive light scattering element is a transmissive diffusor and is arranged at the first surface so that the light is diffused when entering the light guide component.

Some examples of the disclosure provide for a touch sensing apparatus wherein the diffusive light scattering element is a transmissive diffusor and is arranged at the second surface so that the light is diffused when exiting the light guide component.

Some examples of the disclosure provide for a touch sensing apparatus wherein the diffusive light scattering element comprises at least one of an engineer diffusor, a substantially Lambertian diffusor, or a coating.

Some examples of the disclosure provide for a touch sensing apparatus wherein the diffusive light scattering element is bulk scattering particles in the material of the light guide component Some examples of the disclosure provide for a touch sensing apparatus wherein the diffusive light scattering element is a reflector surface.

Some examples of the disclosure provide for a touch sensing apparatus wherein the diffusive light scattering element comprises at least one of a structured reflector surface, a substantially Lambertian diffusor, or a film or coating, and a surface of a component.

Some examples of the disclosure provide for a touch sensing apparatus wherein the light directing arrangement further comprises an angular filter structure arranged in the light path and configured to restrict the emitted light being scattered by the diffusive light scattering element in said light path to a determined angular range in relation to the touch surface.

Some examples of the disclosure provide for a touch sensing apparatus wherein the angular filter structure comprises a longitudinal portion extending in a direction parallel with the touch surface.

Some examples of the disclosure provide for a touch sensing apparatus wherein the longitudinal portion is arranged between the touch surface and a frame element extending above the touch surface to form a transparent sealing portion therebetween.

Some examples of the disclosure provide for a touch sensing apparatus wherein the diffusive light scattering element is arranged in the light path between the emitters and the angular filter structure.

Some examples of the disclosure provide for a touch sensing apparatus wherein the diffusive light scattering element is arranged below the touch surface.

Some examples of the disclosure provide for a touch sensing apparatus wherein the plurality of emitters and/or detectors are arranged above the touch surface.

Some examples of the disclosure provide for a touch sensing apparatus wherein the reflector surface comprises a grooved surface and wherein the grooves are orientated in the plane of the light path.

Some examples of the disclosure provide for a touch sensing apparatus wherein the grooves are formed from scratching or brushing.

Some examples of the disclosure provide for a touch sensing apparatus wherein the reflector surface is a anodized metal.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

These and other aspects, features and advantages of which examples of the disclosure are capable of will be apparent and elucidated from the following description of examples of the present disclosure, reference being made to the accompanying drawings, in which.

DETAILED DESCRIPTION OF EXAMPLE EMBODIMENTS

Figure 1A:
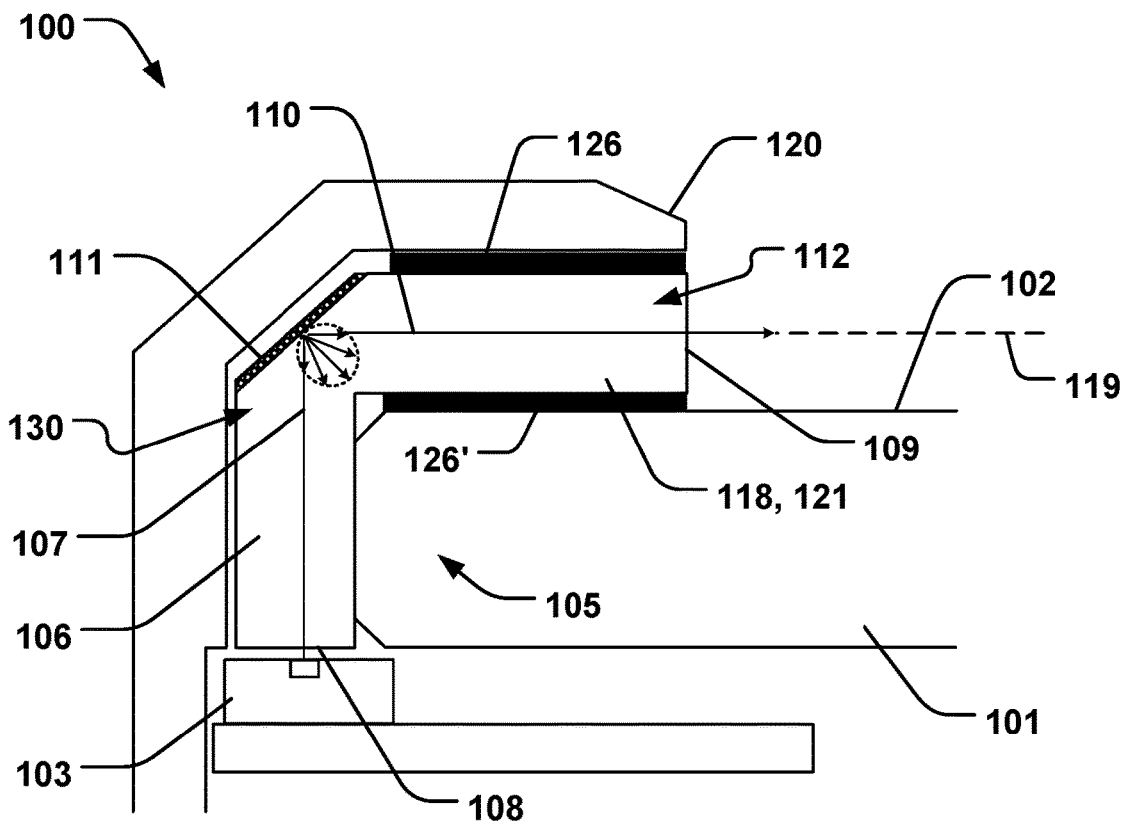
FIGS. 1a-b are schematic illustrations, in cross-sectional side views, of a touch-sensing apparatus, according to one example.

In the following, embodiments of the present disclosure will be presented for a specific example of a touch-sensitive apparatus. Throughout the description, the same reference numerals are used to identify corresponding elements.

Figure 1B:
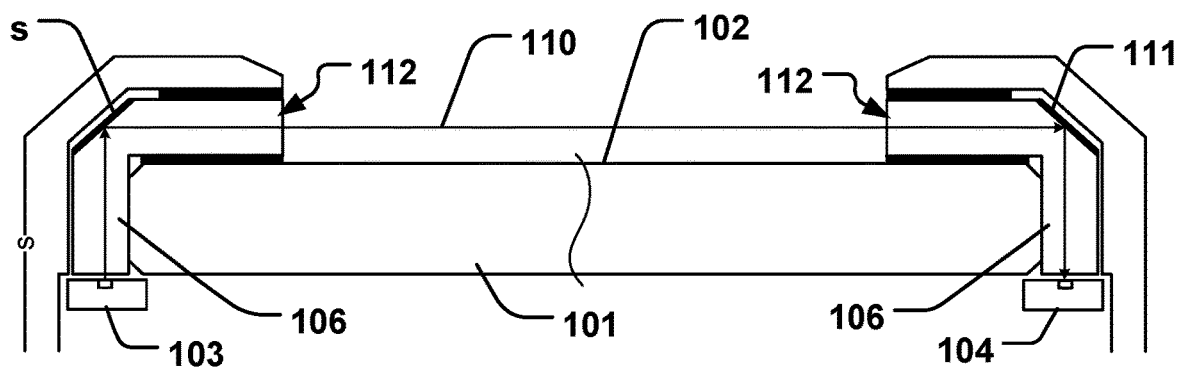

FIGS. 1a and 1b are schematic illustrations of a touch-sensing apparatus 100 comprising a light transmissive panel 101 that defines a touch surface 102, and a plurality of emitters 103 and detectors 104 arranged along a perimeter 105 of the light transmissive panel 101. FIG. 1a shows only an emitter 103 for clarity of presentation, while FIG. 1b illustrates how light is transmitted from an emitter 103 to a detector 104 across the touch surface 102. The touch-sensing apparatus 100 comprises a light directing arrangement 130 comprising a light coupling element 106, also referred to as a light guide component 106 in this disclosure, arranged adjacent and along the perimeter 105. The emitters 103 are arranged to emit a respective beam of emitted light 107 and the light coupling element 106 is arranged to receive the emitted light 107 through a first surface 108 and couple out light travelling in the light coupling element 106 through a second surface 109 thereof to direct the emitted light 107 in a light path 110 from the emitters 103 and across touch surface 102 of the panel 101. The touch-sensing apparatus 100 comprises a diffusive light scattering element 111 arranged in the light path 110. I.e. the light emitted from emitters 103 is scattered by the diffusive light scattering element 111 in the path 110 between the emitters 103 and the touch surface 102. A corresponding concept is schematically illustrated in the examples of FIGS. 1b, 2a-b, 4, 5, 6a-d, 7a-b, 8, 9a-b, 10a-b, 11a-b, 12, 13, 14, 15 and 17.

Figure 2A:
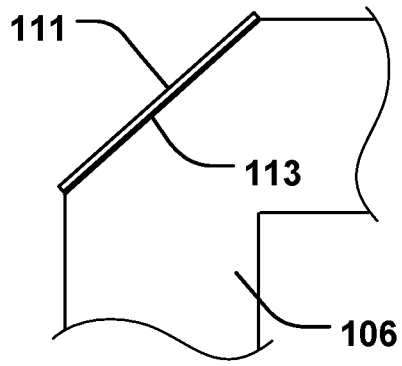
FIGS. 2a-b are schematic illustrations of a light directing arrangement and a diffusive light scattering element according to examples of the disclosure.

The diffusive light scattering element 111 may be arranged on an external surface 113 of the light coupling element 106, as schematically illustrated in FIG. 2a. Hence, the diffusive light scattering element 111 may be attached to or otherwise incorporated onto the light coupling element 106, as well as an optional angular filter structure 112 (effectively being part of the light coupling element 106 in the various examples of the disclosure). This may provide for achieving an efficient transmission of light along a desired light path 110, as well as a facilitated alignment of the optical elements along the path 110. Relaxed alignment requirements is beneficial for mass production.

Figure 2B:
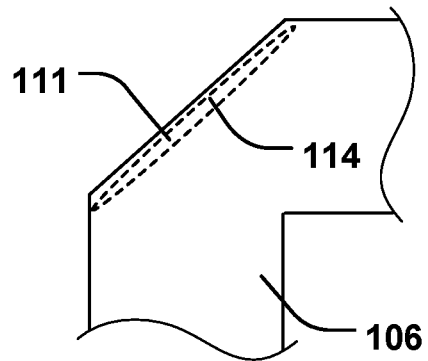

The diffusive light scattering element 111 may be incorporated into an internal surface 114 of the light coupling element 106, as schematically illustrated in FIG. 2b. The diffusive light scattering element 111 may also be arranged at the first surface 108 or second surface 109. The diffusive light scattering element 111 may also be distributed in the light coupling element 106, e.g. by introducing bulk scattering, e.g. by adding $TiO_2$, or any other suitable material for scattering the light. Examples of different diffusive light scattering elements 111 are described later in the description.

Figure 3A:
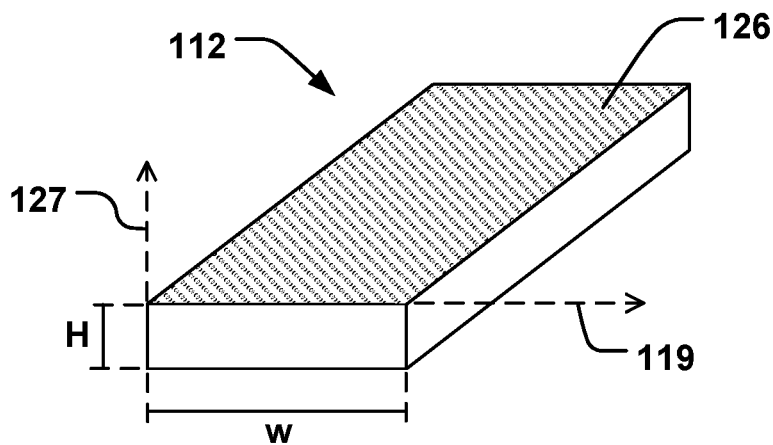
FIGS. 3a-b are schematic illustrations of an angular filter structure according to examples of the disclosure, in a perspective view and in a side view, respectively.
Figure 3B:
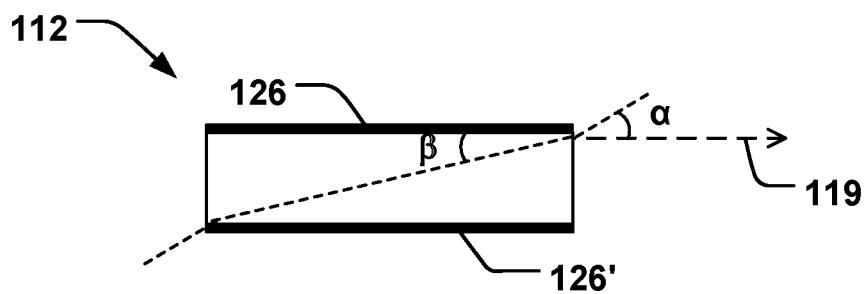

In some embodiments, the touch-sensing apparatus 100 may comprise an angular filter structure 112 arranged in the light path 110. The angular filter structure 112 is configured to confine the emitted light 107, which is scattered by the light scattering element 111 in the light path 110, to a determined angular range in relation to the touch surface 102. Thus, the spreading of the light emitted from emitters 103 is reduced and limited to a defined angle by the angular filter structure 112 in the path 110 between the emitters 103 and the touch surface 102, as schematically illustrated in the examples of FIGS. 1a-b, 4, 5, 6a-d, 7a-b, 8, 10a-b, 11a-b, 12, 13, and 14. Angular filtering may be provided by having light absorbing surfaces 126, 126', arranged at the angular filtering structure 112, that prevents light from being reflected through light absorbing surfaces 126, 126'. FIGS. 3a-b show an example of at least a part of such angular filtering structure 112, with light absorbing surfaces 126, 126', arranged at opposite sides thereof in a direction 127 being a normal direction to a plane in which the touch surface 102 extends. The light absorbing surfaces 126, 126', are separated by the height (H), and extend with a width (w) in a direction 119 parallel with the plane in which the touch surface 102 extends. Referring to FIG. 3b, the relationship between a maximum angle α ($α_{max}$) and the maximum angle β ($β_{max}$) is given by; $\sin α_{max} = n * \sin β_{max}$, where n is the refractive index of the material between the light absorbing surfaces 126, 126', in which the reflection occurs. $β_{max}$ can be determined in relation to the dimensions H and w as; $β_{max} = \arctan(H/w)$. Thus, the dimensions H and w, and the refractive index n can be chosen to so that $α_{max}$ is limited and the emitted light can be confined to a desired angle relative to the direction 119. For example, H/w=0.2, and n=1.5 gives $α_{max}$=17.1°. The angular filtering structure 112 will also provide for blocking ambient light entering detectors 104 at the defined angular range. The angular filtering structure 112 may comprise other structures that prevent light absorbing surfaces, such as absorbing surfaces 128, 128', discussed further in relation to FIG. 12. It is also conceivable that the angular filtering structure 112 comprises light collimating surfaces.

Figure 6A:
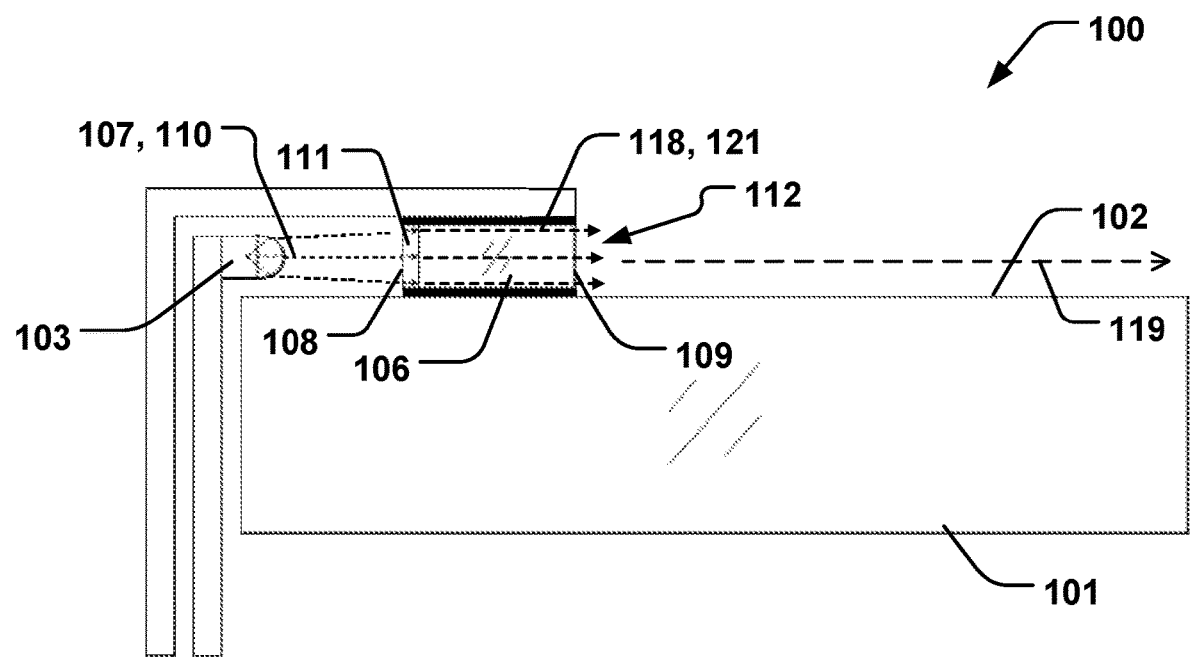
FIG. 6a is a schematic illustration, in a cross-sectional side view, of a touch-sensing apparatus, according to one example.
Figure 6B:
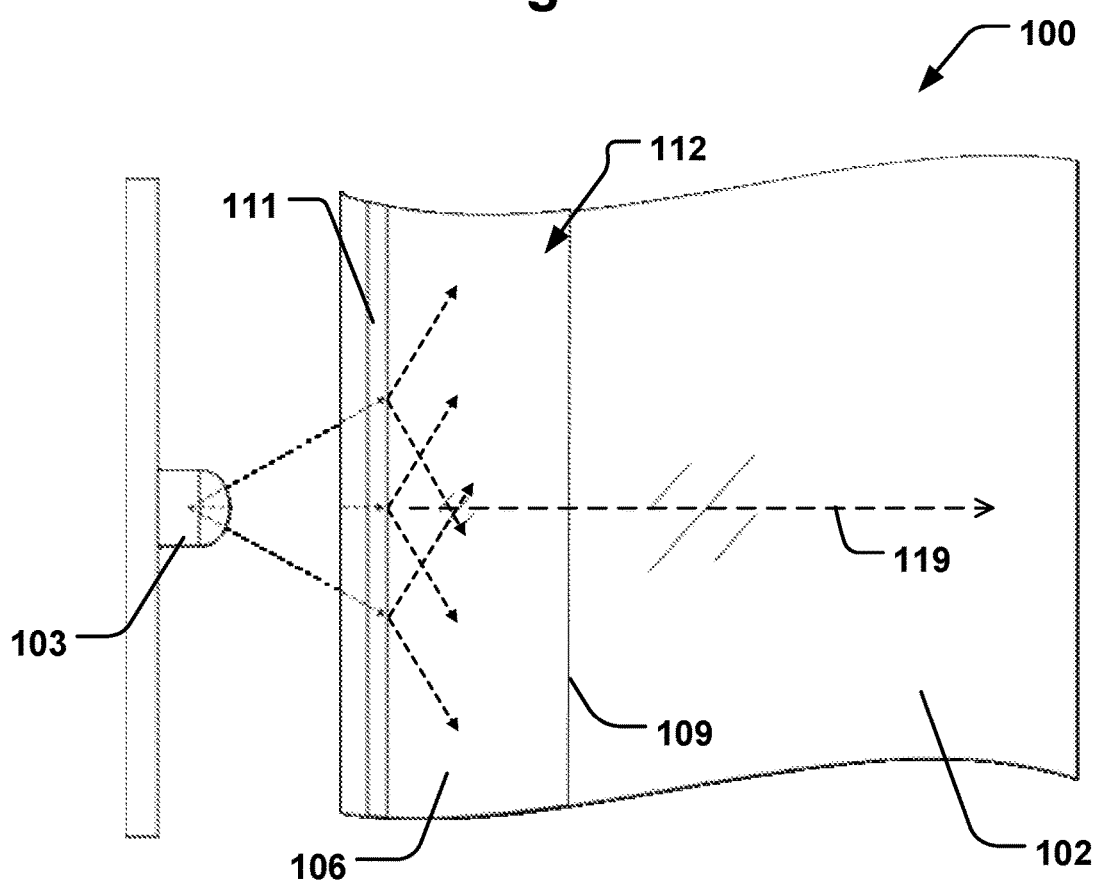
FIG. 6b is a schematic illustration, in a top-down view, of the touch-sensing apparatus in FIG. 6a, according to one example.
Figure 6C:
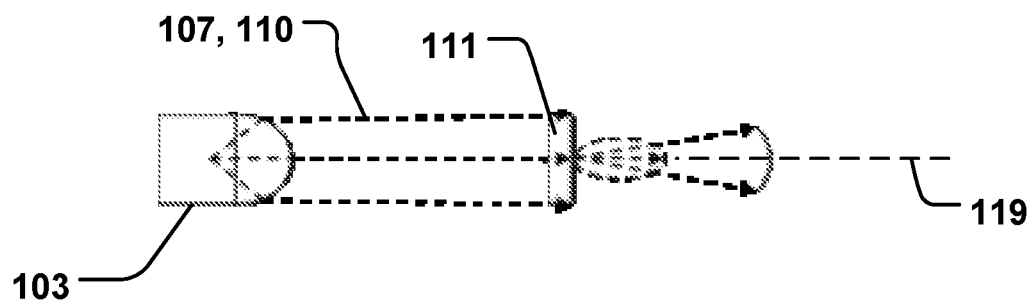
FIG. 6c is a schematic illustration, in a cross-sectional side view, of an emitter and a diffusive light scattering element according an example of the disclosure.
Figure 6D:
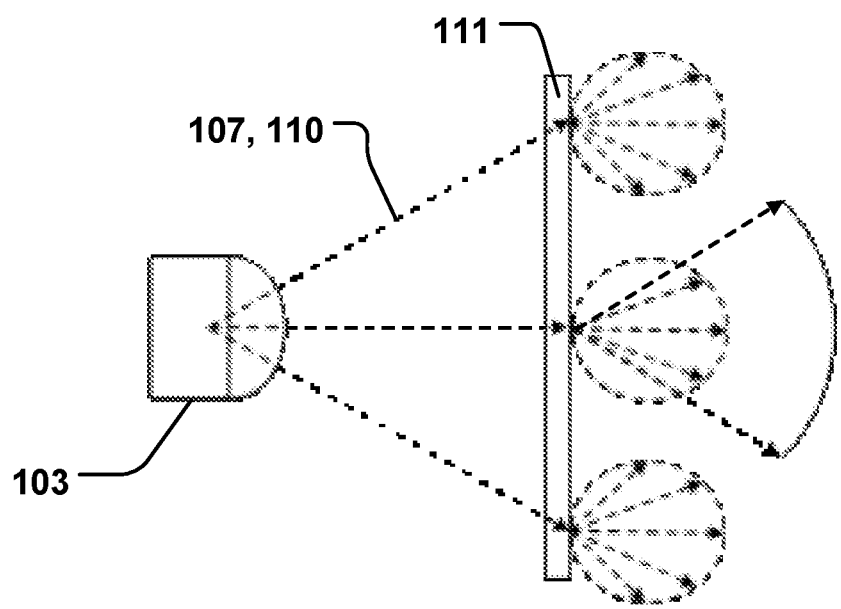
FIG. 6d is a schematic illustration, in a top-down view, of the emitter and the diffusive light scattering element in FIG. 6c, according to one example.
Figure 7A:
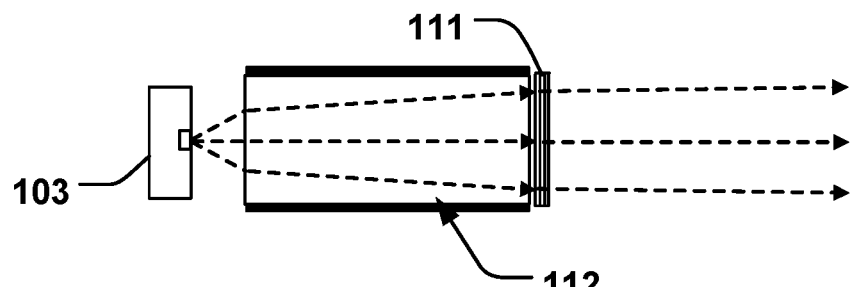
FIG. 7a is a schematic illustration, in a cross-sectional side view, of an emitter, an angular filter structure, and a diffusive light scattering element, or engineered diffuser, according an example of the disclosure.
Figure 7B:
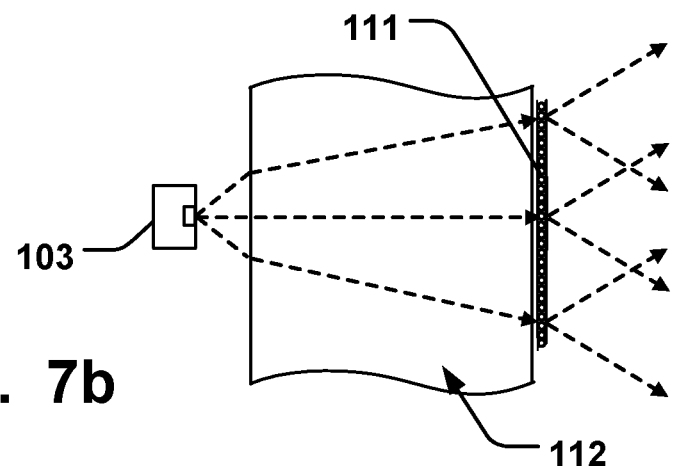
FIG. 7b is a schematic illustration, in a top-down view, of the emitter, angular filter structure, and diffusive light scattering element, or engineered diffuser, in FIG. 7a, according to one example.
Figure 8:
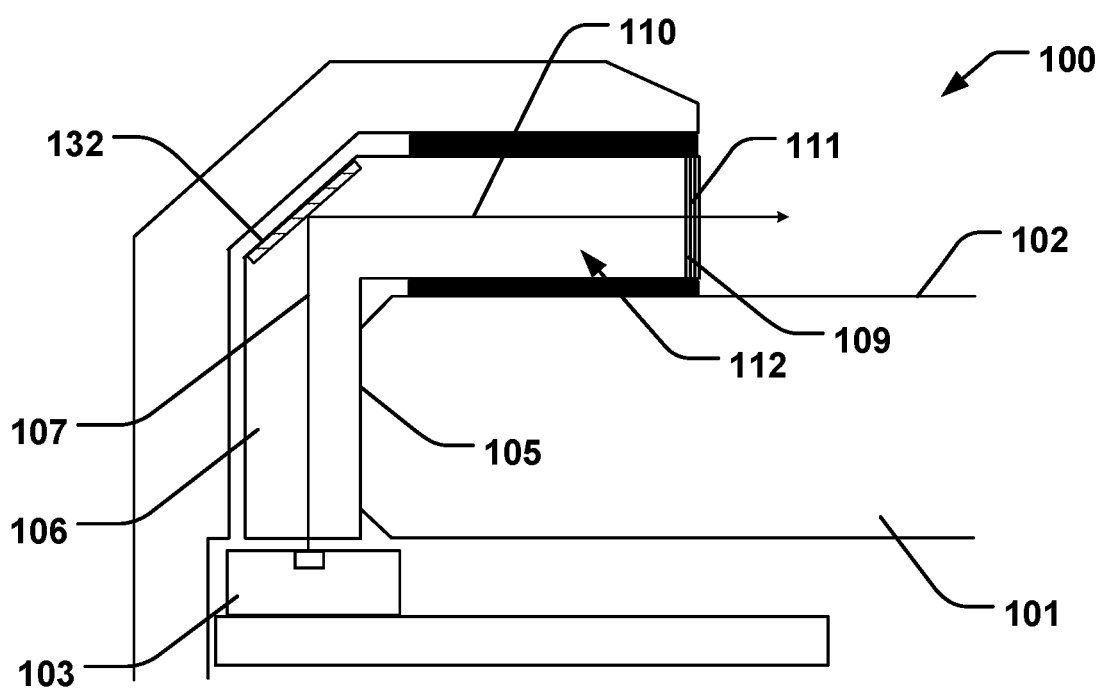
FIG. 8 is a schematic illustration, in a cross-sectional side view, of a touch-sensing apparatus, according to one example.

While some examples, such as those schematically illustrated in e.g. FIGS. 1a-b, 4, 5, 6a-d, 10a-b, 11a-b, 12, 13, and 14, show the angular filter structure 112 being arranged to limit the spread of emitted light 107 that has been scattered by the diffusive light scattering element 111, it is conceivable that the emitted light 107 is first confined by the angular filter structure 112 to a desired angle and then scattered by the diffusive light scattering element 111, as schematically illustrated in FIGS. 7a-b, and 8.

One embodiment provides an arrangement comprising both a diffusive light scattering element 111 to diffusively scatter the emitted light 107, as well as an angular filter structure 112 in the light path 110. This embodiment provides for broadening the emitted light 107 in a first direction and restricting the spread of the emitted light 107 in a second direction, such as in opposite directions, e.g. with the first direction being perpendicular to the second direction. Limiting the angle by which the light is spread in the second direction provides for reducing the risk of stray light effects, i.e. light is not sent in directions where it is not wanted.

Further, as mentioned above, this also provides for blocking of ambient light since only light incident at the defined angular range will reach the detectors 104. Interference with the light detection may thus be reduced. Turning to the example in FIG. 1a, the diffusive light scattering element 111 may thus diffusively scatter the emitted light 107, while the angular filter structure 112 restricts the spread of the scattered light outside the plane of the touch surface 102. The diffusive light scattering element 111 may be arranged and configured to predominantly scatter the light in the plane of the touch surface 102, and the angular filter structure 112 allows to further restrict the angle by which the light spreads from the plane of the touch surface 102.

The angular filter structure 112 may comprise a longitudinal portion 118 of the light coupling element 106 extending in a direction 119 parallel with the touch surface 102, as well as along the perimeter 105, as schematically illustrated in e.g. FIGS. 1a-b, 3a-b, 4, 5, 6a, 8, 10a, 11a-b, 13, and 14. Having a longitudinal portion 118 extending in the direction 119 of the plane of the touch surface 102 provides for efficiently confining the spread of the light in the aforementioned plane. It is conceivable that the angular filter structure 112 comprises other elements such as lenses to optimize the confinement of the light in various applications.

The longitudinal portion 118 may be arranged between the touch surface 102 and a frame element 120 extending above the touch surface 102 to form a transparent sealing portion 121 therebetween, as schematically illustrated in e.g. FIG. 1a. Thus, the angular filter structure 112 and the longitudinal portion 118 thereof may simultaneously provide for sealing between the panel 101 and the frame element 120. This provides for a compact profile of the touch-sensing apparatus along the periphery 105 thereof.

Figure 4:
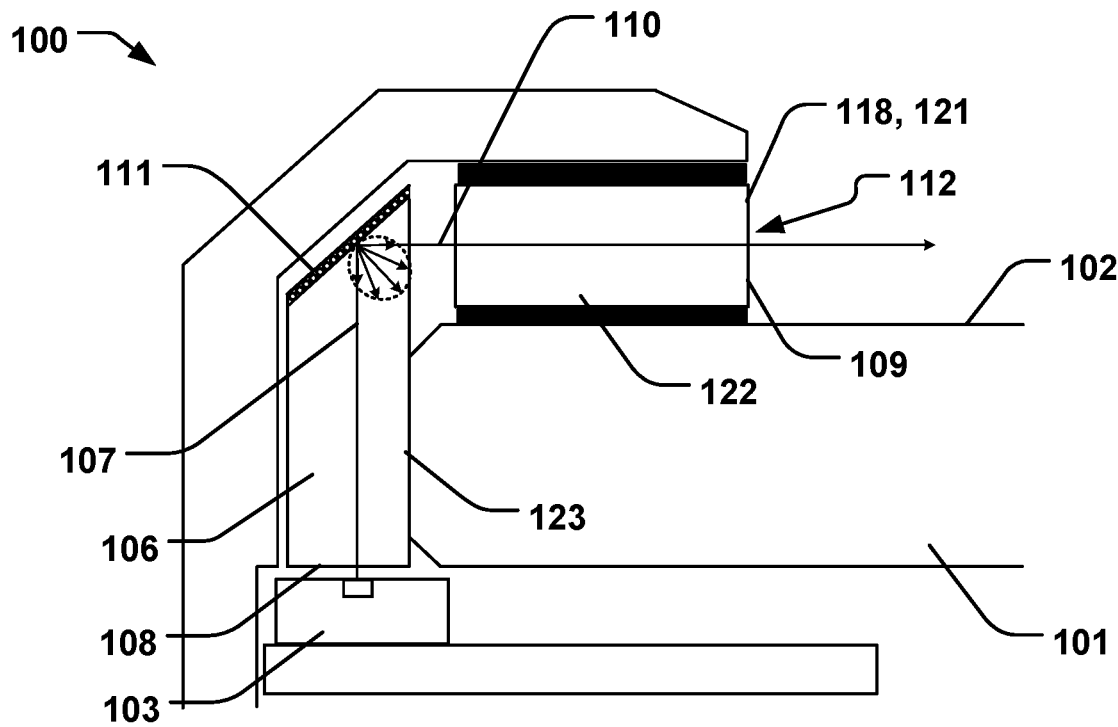
FIG. 4 is a schematic illustration, in a cross-sectional side view, of a touch-sensing apparatus, according to one example.

As seen in the example of FIG. 4, a longitudinal portion 118 may form a second portion 122 of the light coupling element 106 being separated from a first portion 123 thereof. The first portion 123 may comprise the aforementioned first surface 108. The first portion 123 may further be arranged at least partly outside the perimeter 105. Thus, FIG. 4 show one example where the longitudinal portion 118 is separated from a first portion 123 of the light coupling element 106. Emitted light is scattered at diffusive light scattering element 111 towards the angular filter structure 112 and the longitudinal portion 118 thereof. In this example the diffusive light scattering element 111 is arranged at the first portion 123. The diffusive light scattering element 111 may also be arranged on the second portion 118. In the example of FIG. 6a, the light coupling element 106 and angular filter structure 112 is formed as an integral piece, extending in a longitudinal direction along the plane of the touch surface 102. In the latter example, the first portion 123 of the light coupling element has been omitted since the emitter 103 is arranged above the touch surface 102.

Figure 5:
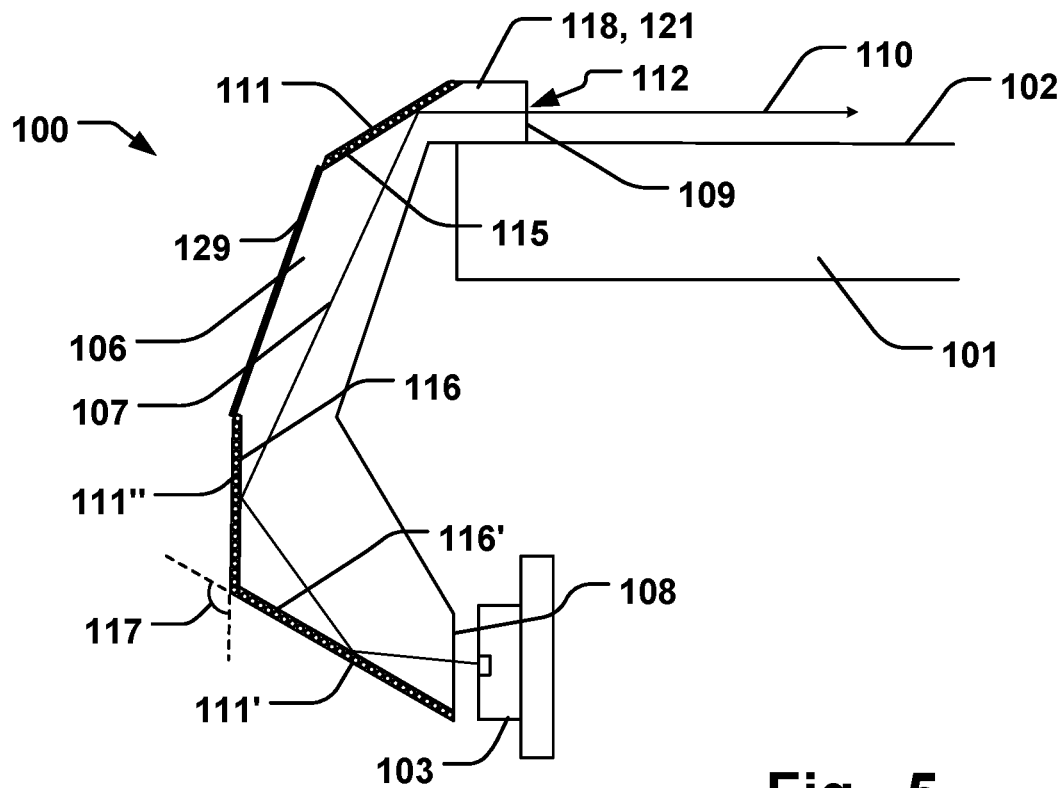
FIG. 5 is a schematic illustration, in a cross-sectional side view, of a touch-sensing apparatus, according to one example.

The light coupling element 106 may comprises at least two internal reflection surfaces 115, 116, 116', arranged for reflecting and coupling the emitted light between the aforementioned first and second surfaces 108, 109, as schematically illustrated in FIG. 5. The diffusive light scattering element 111 may be arranged along the at least two internal reflection surfaces 115, 116, 116', as indicated by diffusive light scattering elements 111, 111', 111". Extending the length of the light path 110 by introducing more reflections, and having a plurality of reflections at diffusive light scattering elements 111, 111', 111", in the light coupling element 106 provides for utilizing a larger portion of the emitted light 107. This is also provided for by having reflection surfaces 116, 116', configured for specular reflection. The signal to noise ratio may thus be improved. FIG. 5 is one example of having a plurality of diffusive light scattering elements 111, 111', 111", and it is conceivable that any plurality of such elements may be provided in the light path 110. The angular filter structure 112 is arranged at the touch surface 102 to suppress reflections in directions out of the plane of the touch surface 102. Reflection surface denoted with numeral 129 may be provided with a black film to restrict ambient or stray light. The at least two internal reflection surfaces 116, 116', may intersect each other at an angle 117, e.g. as illustrated in FIG. 5. The angle 117 may be varied to achieve the desired propagation of light along the light coupling element 106.

The plurality of emitters 103 and/or detectors 104 may be arranged above the touch surface 102, as illustrated in the examples of FIGS. 6*a-b*, 10*a-b*, 11*b*. This may be desirable in some applications, and can provide for facilitated alignment of the emitters 103/detectors 104, and/or a facilitated manufacturing process.

The diffusive light scattering element 111 may be arranged in the light path 110 between the emitters 103 and the angular filter structure 112, as shown in the examples of FIGS. 1*a-b*, 4, 5, 6*a-d*, 10*a-b*, 11*a-b*, 12, 13, and 14. The angular filter structure 112 may thus effectively block light that is not in the plane of the touch surface 102, thus improving ambient and stray light rejection. The arrangement schematically illustrated in FIG. 1*a* may at the same time provide for a particular compact and robust assembly of the touch-sensing apparatus 100 with a minimal number of individual parts. The example of FIG. 1*a* show the angular filter structure 112 integrated as a part of the light coupling element 106 receiving the emitted light through the first surface 108. The light coupling element 106 also incorporates the diffusive light scattering element 111 at an angled surface arranged above the touch surface 102. Although, as explained further below, the diffusive light scattering element 111 may be arranged in the light path 110 between the emitters 103 and the angular filter structure 112 in various other configurations.

The diffusive light scattering element 111 may extend at least partly above the touch surface 102, as schematically illustrated in e.g. FIGS. 1*a-b*, 4, 5, 10*a-b*, 11*a-b*, 13, and 14. The diffusive light scattering element 111 is positioned in relation to the emitters 103 to scatter the emitted light 110. In the examples of e.g. FIGS. 1*a-b*, 4, 5, 6*a-d*, 10*a-b*, 11*a-b*, 13, and 14, the angular filter structure 112 receives the scattered light. Having a separation between the emitters 103 and the diffusive light scattering element 111, as allowed by e.g. positioning the latter above the touch surface 102, and arranging the emitters 103 below the touch surface 102 may provide for increasing the effective size of the emitters 103 and detectors 104, i.e. broadening of the scanlines, and also a compact profile of the touch-sensing apparatus around the periphery 105. A more effective scattering may also be provided by folding and extending the light path 110 as further described in relation to FIGS. 10*a-b*, 11*a*, and 5.

The diffusive light scattering element 111 may be arranged at least partly outside the perimeter 105, as schematically illustrated in e.g. FIGS. 1*a*, 4, 12, 13, 5, 14. This allows for directing the light path 110 around the sides of the panel 101, thus avoiding any loss of light through the panel 101 itself, while having a compact arrangement with emitters and detectors 103, 104, below the touch surface 102.

FIGS. 6*a-b* show another example of how the emitter 103 may be arranged in relation to the diffusive light scattering element 111 and the angular filter structure 112, which will be discussed further below. FIGS. 6*a-b* show an embodiment using an LED with an asymmetric lens, thus emitting light having an angular distribution wider in one direction than another. FIG. 6*c* shows a light path of the emitted light in FIG. 6*a*, i.e. in a cross-sectional view. Thus, as illustrated, the spread of the emitted light 107 from a direction 119 parallel to the touch surface 102 may be minimal, e.g. ±5° or less, while a significant broadening, e.g. ±45° or more, such as ±75°, is provided in the plane of the touch surface 102, as illustrated in the top-down view of the light path 110 in FIG. 6*d* corresponding to top down view of the touch-sensing apparatus 100 in FIG. 6*b*. This enables for more scan lines to cross the touch surface 102, and provides for reducing the risk of missing small objects with the grid of scanlines across the touch surface 102. At the same time the number of emitters 103 and detector 104 can be kept at a minimum. The scanlines are effectively broadened in the plane of the touch surface 102, and any "gaps" between scanlines can be reduced or avoided. A scanline is defined as having a width. The scanline width is the width of the portion of light travelling from the emitter to the detector that can be used to detect an interrupting object between the emitter and detector, wherein the width is measured perpendicular to the scanline direction. In the present disclosure, the broadening of a scanline is defined to mean the increase in scanline width. Therefore, through broader scanlines, the resolution and accuracy of the touch-sensing apparatus 100 may thus be improved and the touch performance is increased. There will also be less variation in the attenuation of the detection signal for all types of objects as the objects move, which thus improves the classification abilities of various objects used on the touch surface 102. At the same time, the need to introduce a more complex arrangement of optical, mechanical or electrical components, such as increasing the number of emitters 103 and detectors 104 is alleviated, while still achieving a better scanline coverage across the touch panel 102. Having an angular filter structure 112 and a diffusive light scattering element 111 arranged in the light path 110 as described thus provides for effectively shaping the light beams for an optimized coverage in the plane of the touch surface 102, while scattering out from said plane is minimized. The interplay between the emitters 103 and the detectors 104 and their relative arrangement can be optimized to effectively provide for broadening of the scanlines, since several emitters 103 and detectors 104 may interact for each scanline. The position of the diffusive light scattering element 111 in relation to the emitters 103, angular filter structure 112, and the panel 102 may be varied as described further below for optimization of the performance of the touch-sensing apparatus 100 to various applications. Further variations are also conceivable within the scope of the present disclosure while providing for the advantageous benefits as generally described herein. The described examples refer primarily to aforementioned elements in relation to the emitters 103, to make the presentation clear, although it should be understood that the corresponding arrangements also apply to the detectors 104.

Figure 9A:
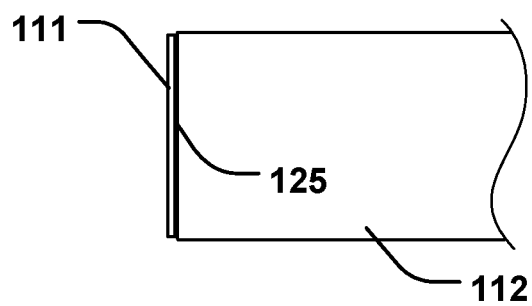
FIGS. 9a-b are schematic illustrations, in cross-sectional side views, of an angular filter structure and a diffusive light scattering element according to examples of the disclosure.
Figure 9B:
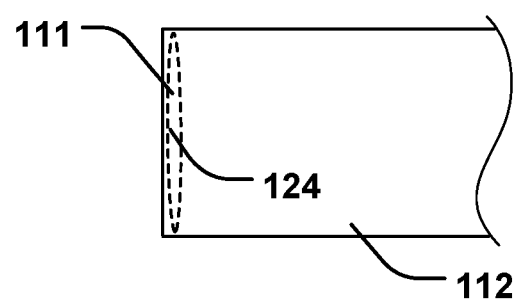

The diffusive light scattering element 111 may be arranged at an internal 124 and/or external 125 surface of the angular filter structure 112, as schematically illustrated in FIGS. 9*a-b*. It can also be implemented by distributing scattering particles (e.g. TiO2) throughout the bulk of the angular filter structure 112.

The illustrated section of the angular filter structure 112 in FIGS. 9*a-b* may correspond to the longitudinal portion 118 referred to above. I.e. FIGS. 9*a-b* may be construed as magnified views of a section of the longitudinal portion 118.

Figure 10A:
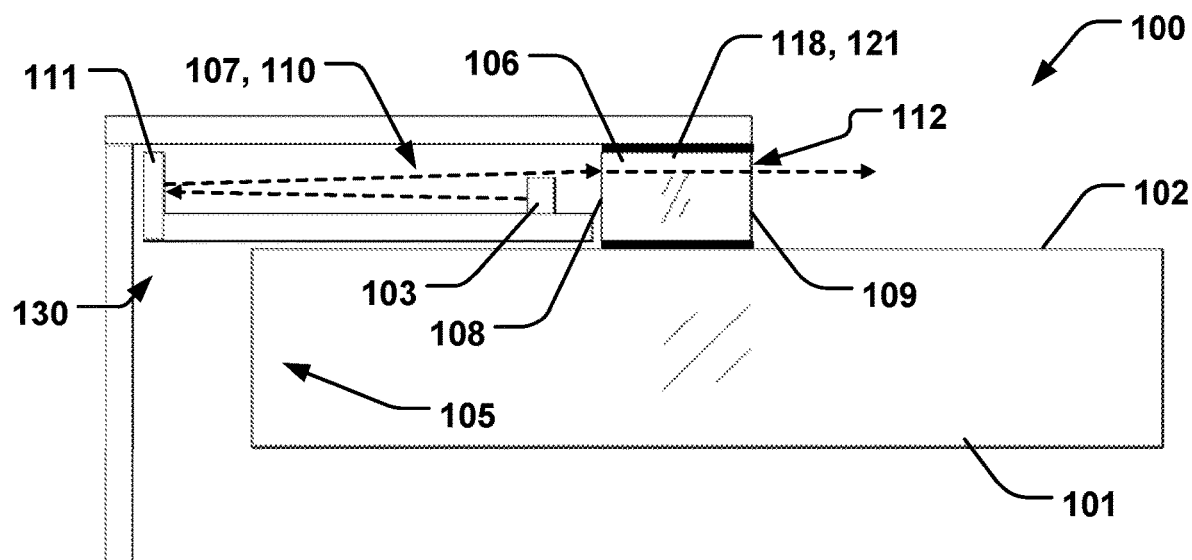
FIG. 10a is a schematic illustration, in a cross-sectional side view, of a touch-sensing apparatus, according to one example.
Figure 10B:
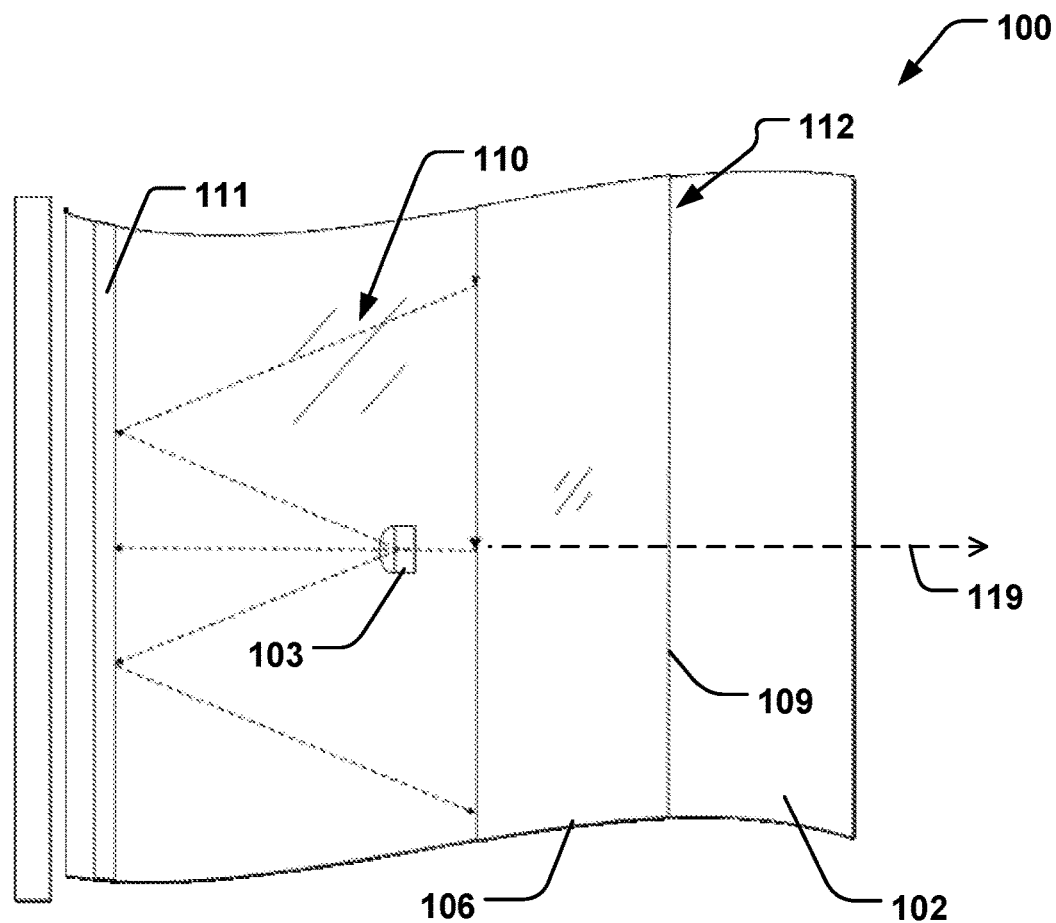
FIG. 10b is a schematic illustration, in a top-down view, of the touch-sensing apparatus in FIG. 10a, according to one example.
Figure 11A:
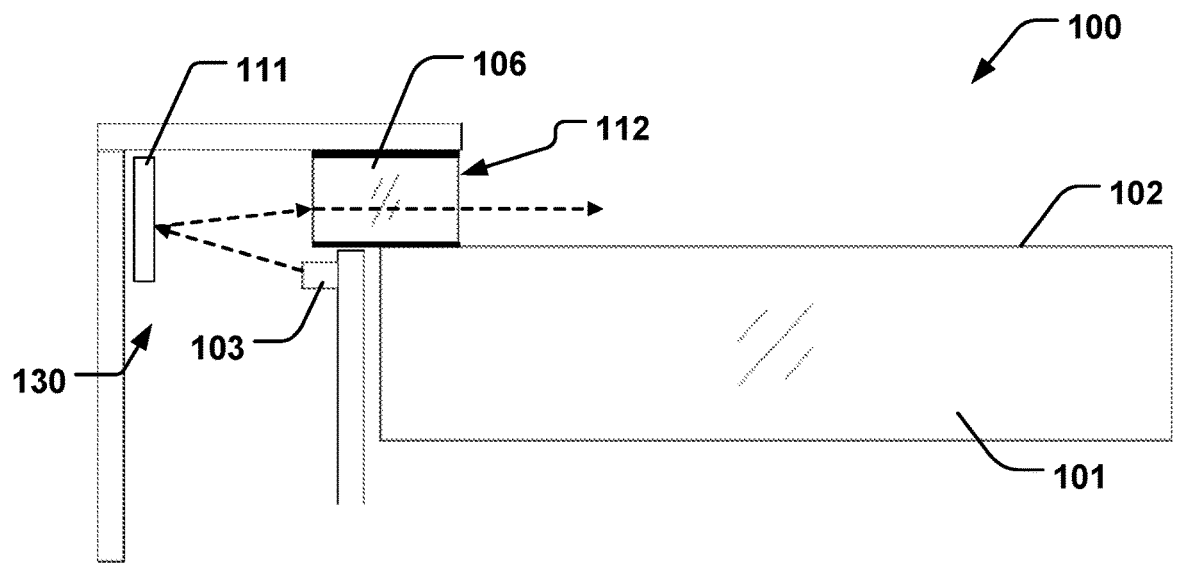
FIGS. 11a-b are schematic illustrations, in cross-sectional side views, of a touch-sensing apparatus, according to examples of the disclosure.
Figure 11B:
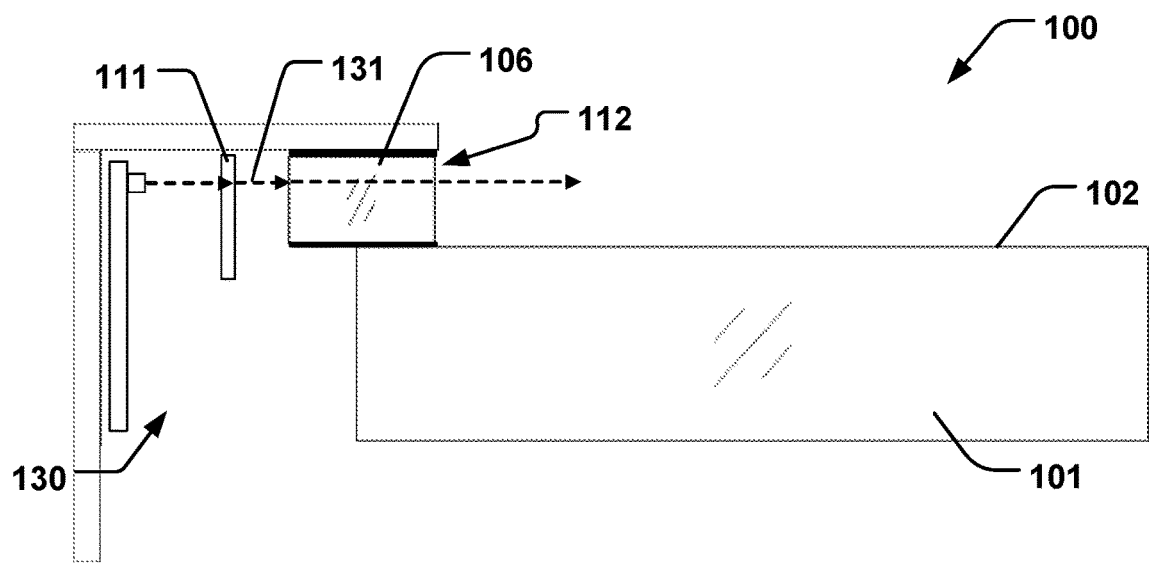

In some embodiments, a light directing arrangement 130 comprises a diffusive light scattering element 111 independent from any light coupling element 106 and/or the angular filter structure 112, as schematically illustrated in FIGS. 10*a-b*, 11*a-b*, 12, 13, 14, 15, and FIG. 17. For example, turning to FIG. 11*b*, the diffusive light scattering element 111 is placed between the emitter 103 and the light coupling element 106/angular filter structure 112, with a spacing 131 from the latter, compared to the example shown in FIG. 6*a* where the diffusive light scattering element 111 is attached to or incorporated into the light coupling element 106/angular filter structure 112. FIG. 11*a* illustrates a further example of having a separated diffusive light scattering element 111, and folding of the light path 110, as will be described in more detail below.

The diffusive light scattering element 111 may be arranged at, or in, the surface 108 receiving the emitted light 107 from the emitters 103, as schematically illustrated in FIG. 6*a*. The diffusive light scattering element 111 is still arranged at a distance from the emitter 103 so that the scanline is broadened. A larger the separation between the emitter 103 and the diffusive light scattering element 111 provides for a broader scan line.

The plurality of emitters 103 may be arranged above the touch surface 102 and between the diffusive light scattering element 111 and the angular filter structure 112. Further, the emitters 103 may be arranged to emit light outwards from the touch surface 102 towards the perimeter 105 thereof for diffusive reflection at the diffusive light scattering element 111, as schematically illustrated in FIGS. 10*a-b*. I.e. the emitted light is scattered back towards the emitter 103 and the light coupling element 106/angular filter structure 112. Such arrangement may be advantageous in some applications for providing a further broadening of the scanlines across the touch surface 102, since the length of the light path 110 may be increased, while allowing for facilitated manufacturing process as mentioned above. The effective light source position is also shifted outwards, hence improving the touch performance at the edges of the touch surface 102.

FIG. 11*a* show another example of having the emitters 103 arranged to emit light in an outward direction with respect to the panel 101, here with the emitters 103 arranged below the touch surface 102, to provide for another alternative of folding and extending the light path 110.

Figure 12:
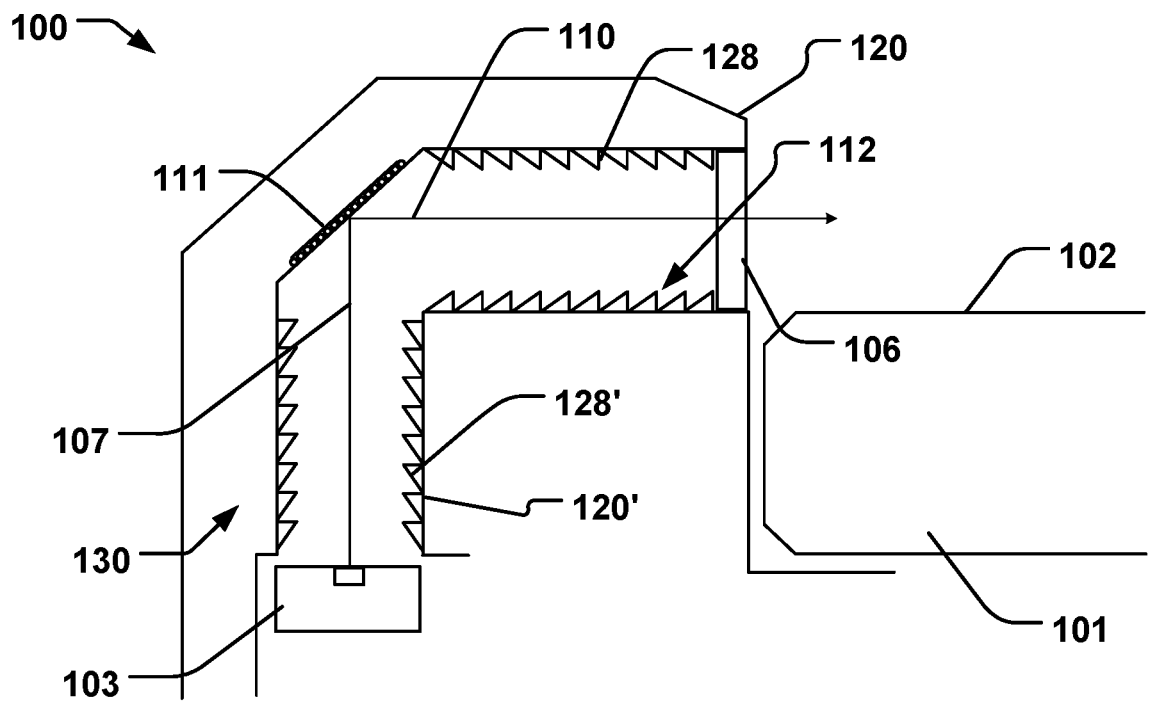
FIG. 12 is a schematic illustration, in a cross-sectional side view, of a touch-sensing apparatus, according to one example.

FIG. 12 is another schematic illustration of an angular filter structure 112 having absorbing surfaces 128, 128', arranged along the light path 110, which prevent light propagation at certain angular intervals. Thus, ambient light or system stray light is prevented from being reflected towards the detectors 104. Any plurality of surfaces 128, 128', may be arranged along the light path 110. It is also conceivable that a specular reflecting surface may be arranged where the diffusive light scattering element 111 is show. As the light coupling element 106 can have a narrow width (since the angular filtering is provided by absorbing 128, 128'), the distance between the emitter 103 and the light coupling element 106 can be increased, allowing for scanline broadening. In another example, a diffusive light scattering element 111 may be arranged at the light coupling element 106 of FIG. 12. The absorbing surfaces 128, 128', may be formed directly in the frame elements 120, 120'.

Figure 13:
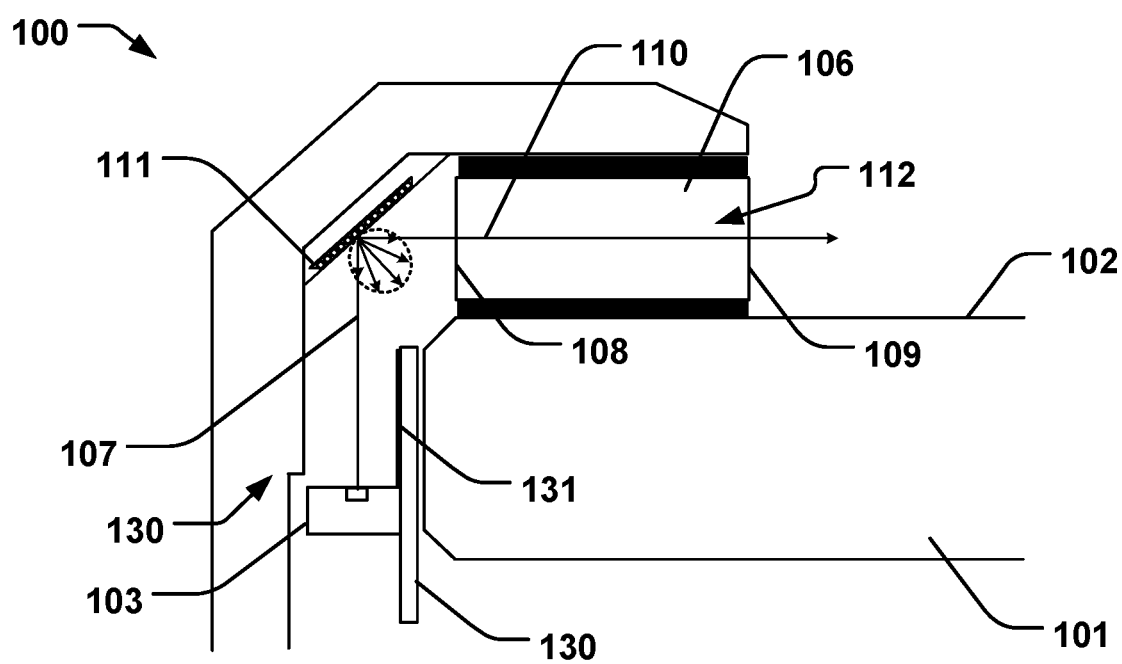
FIG. 13 is a schematic illustration, in a cross-sectional side view, of a touch-sensing apparatus, according to one example.

FIG. 13 is a schematic illustration where the emitters 103 (and detectors 104) have been mounted on a PCB being vertically arranged. The PCB may have an inner reflective side 131, which may have a reflective material, such as Au.

Figure 14:
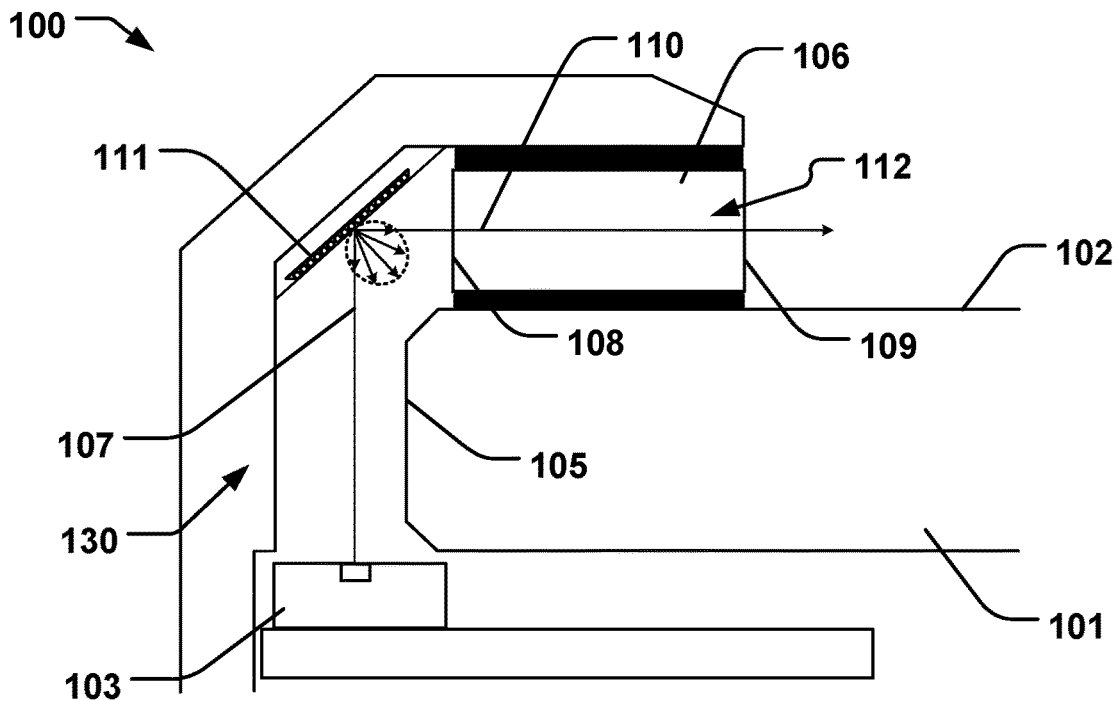
FIG. 14 is a schematic illustration, in a cross-sectional side view, of a touch-sensing apparatus, according to one example.

In the example of FIG. 14, the light coupling element 106 and angular filter structure 112 also extends in the direction of the plane of the touch surface 102 as an integral piece. The emitter 103 is arranged below the touch surface 102, and the light is instead scattered at a separate diffusive light scattering element 111 towards the angular filter structure 112. Also in this example, it is conceivable that the diffusive light scattering element 111 is arranged on, or in, the light coupling element 106/angular filter structure 112, and the emitted light may instead be specularly reflected at the surface where reference number 111 in FIG. 14 points.

The diffusive light scattering element 111, 111', 111'', may be configured as an essentially ideal diffuse reflector, also known as a Lambertian or near-Lambertian diffuser, which generates equal luminance in all directions in a hemisphere surrounding the diffusive light scattering element. Many inherently diffusing materials form a near-Lambertian diffuser. In an alternative, the diffusive light scattering element 111 may be a so-called engineered diffuser with well-defined light scattering properties. This provides for a controlled light management and tailoring of the light scattering abilities. A film with groove-like or other undulating structures may be dimensioned to optimize light scattering at particular angles. The diffusive light scattering element 111 may comprise a holographic diffuser. In a variant, the engineered diffuser is tailored to promote diffuse reflection into certain directions in the surrounding hemisphere, in particular to angles that provides for the desired propagation of light above and across the touch surface 102.

The diffusive light scattering element may be configured to exhibit at least 50% diffuse reflection, and preferably at least 90% diffuse reflection.

The diffusive light scattering element 111, 111', 111'', may be implemented as a coating, layer or film applied by e.g. by anodization, painting, spraying, lamination, gluing, etc. In one example, the scattering element 111, 111', 111'', is implemented as matte white paint or ink. In order to achieve a high diffuse reflectivity, it may be preferable for the paint/ink to contain pigments with high refractive index. One such pigment is $TiO_2$, which has a refractive index n=2.8. The diffusive light scattering element 111, 111', 111'', may comprise a material of varying refractive index. It may also be desirable, e.g. to reduce Fresnel losses, for the refractive index of the paint filler and/or the paint vehicle to match the refractive index of the material on which surface it is applied. The properties of the paint may be further improved by use of EVOQUE™ Pre-Composite Polymer Technology provided by the Dow Chemical Company. There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc.

Alternatively, the diffusive light scattering element 111, 111', 111'', may be implemented as a flat or sheet-like device, e.g. the above-mentioned engineered diffuser, diffuser film, or white paper which is attached by e.g. an adhesive. According to other alternatives, the diffusive light scattering element 111, 111', 111'', may be implemented as a semi-randomized (non-periodic) micro-structure on the external surfaces 113, 125, possibly in combination with an overlying coating of reflective material.

A micro-structure may be provided on the external surface 113, 125, and/or internal surface 114, 124, by etching, embossing, molding, abrasive blasting, scratching, brushing etc. The diffusive light scattering element 111, 111', 111'', may comprise pockets of air along the internal surface 114, 124, that may be formed during a molding procedure of the light coupling element 106 and/or angular filter structure 112 (effectively forming part of the light coupling element 106 in some of the above described examples). It may also be possible to incorporate a film of diffusive properties into the internal surface 114, 124, when forming the light coupling element 106 and/or angular filter structure 112. In another alternative, the diffusive light scattering element 111, 111', 111", may be light transmissive (e.g. a light transmissive diffusing material or a light transmissive engineered diffuser) and covered with a coating of reflective material at an exterior surface. Another example of a diffusive light scattering element 111, 111', 111", is a reflective coating provided on a rough surface.

The diffusive light scattering element 111, 111', 111", may comprise lenticular lenses or diffraction grating structures. Lenticular lens structures may be incorporated into a film which is applied to the light coupling element 106 and/or angular filter structure 112. The diffusive light scattering element 111, 111', 111", may comprise various periodical structures, such as sinusoidal corrugations provided onto the internal surfaces 114, 124, and/or external surfaces of the light coupling element 106 and/or angular filter structure 112. The period length may be in the range of between 0.1 mm-1 mm. The periodical structure can be aligned to achieve scattering in the desired direction. E.g., in the examples shown in FIGS. 7a-b and FIG. 8, the diffusive light scattering element 111 may have a periodical sinusoidal corrugation aligned so that the 'ridges' of the corrugation extend longitudinally in a direction perpendicular to the plane of the touch surface 102. Hence, the light will be scattered in the aforementioned plane, as schematically illustrated in FIGS. 7a-b. In this case, having the angular filter structure 112 arranged in the light path before the diffusive light scattering element 111 provides for another alternative to achieve scan line broadening. In the example of FIG. 8, the light may be reflected towards the angular filter structure 112 of the light coupling element 106 by specular reflection at reflection surface 132.

The diffusive light scattering element 111, 111', 111", may be co-extruded with the light coupling element 106, and/or angular filter structure 112 in the manufacturing process.

Hence, as described, the diffusive light scattering element 111, 111', 111", may comprise; white- or colored paint, white- or colored paper, Spectralon, a light transmissive diffusing material covered by a reflective material, diffusive polymer or metal, an engineered diffuser, a reflective semi-random micro-structure, in-molded air pockets or film of diffusive material, different engineered films including e.g. lenticular lenses, or other micro lens structures or grating structures. The diffusive light scattering element 111, 111', 111", preferably has low NIR absorption.

Figure 15:
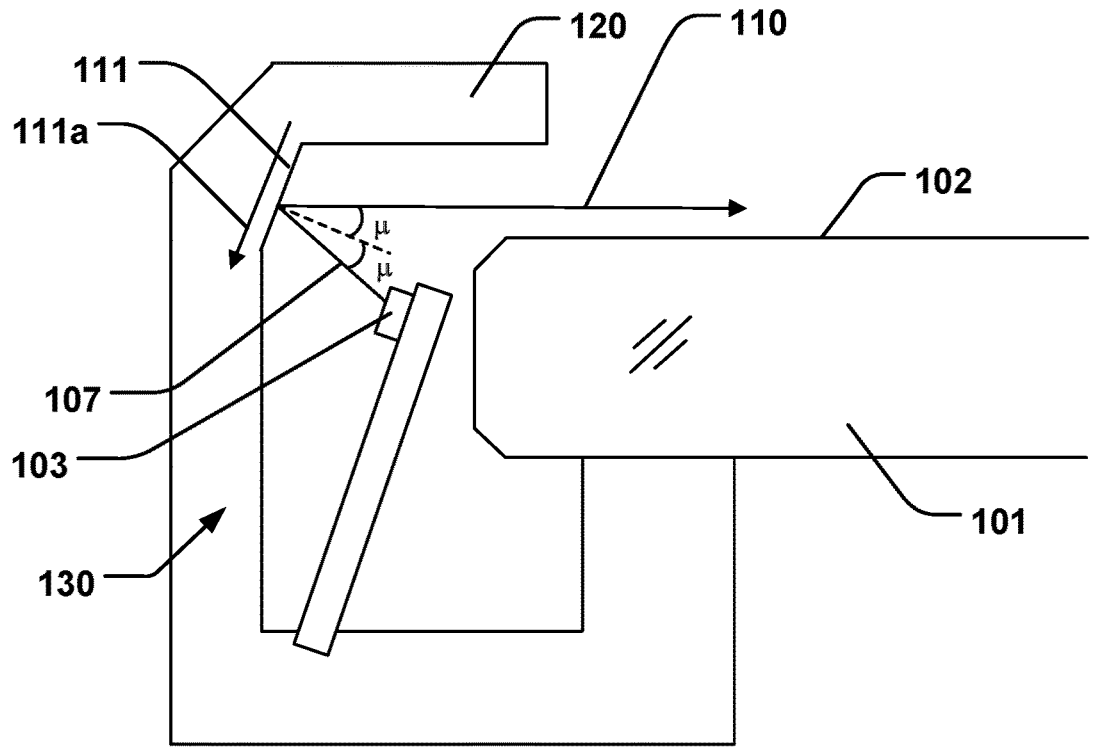
FIG. 15 is a schematic illustration, in a cross-sectional side view, of a touch-sensing apparatus, according to one example.
Figure 16:
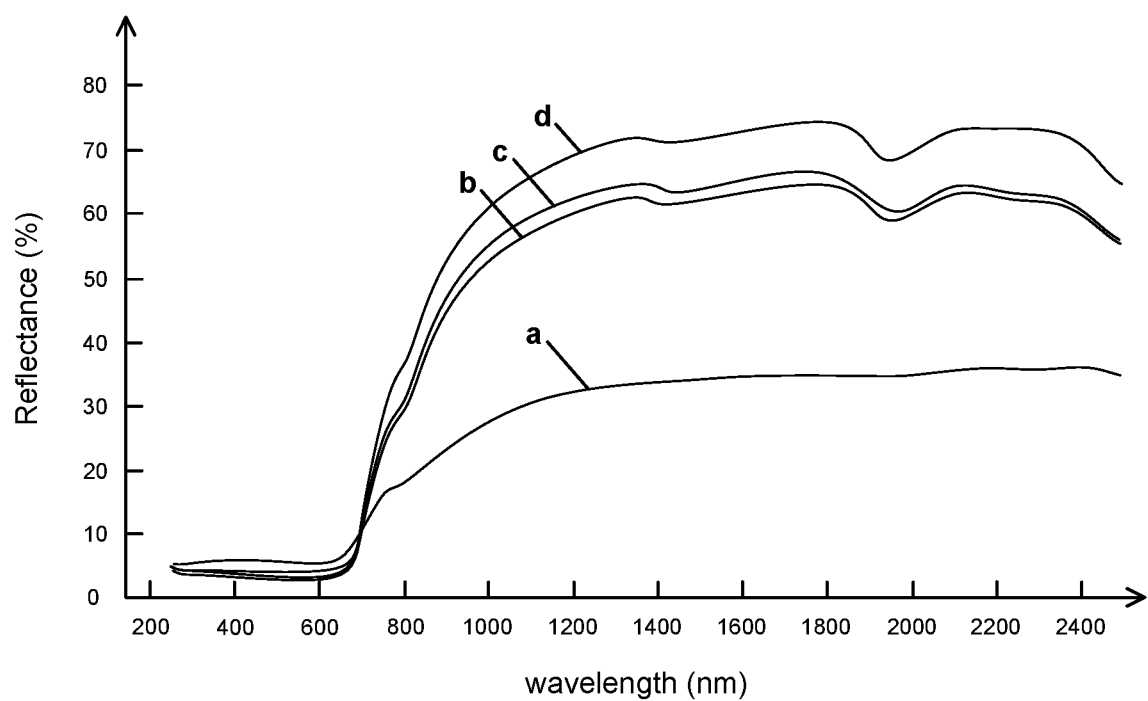
FIG. 16 is a diagram showing the total reflectance (%) for black anodized aluminium as function of the wavelength (nm)
Figure 17:
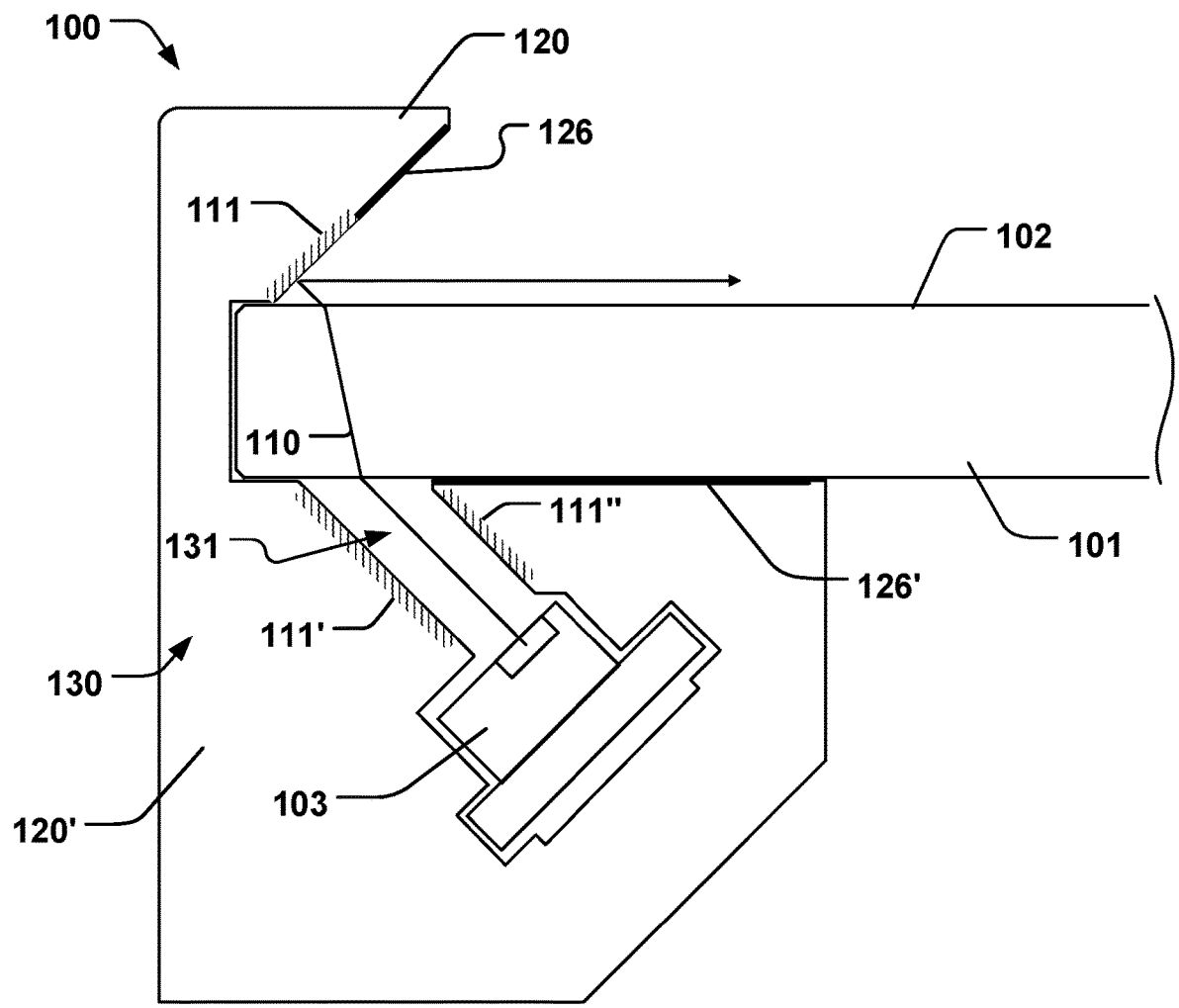
FIG. 17 is a schematic illustration, in a cross-sectional side view, of a touch-sensing apparatus, according to one example.

FIG. 15 is a schematic illustration where the emitters 103 (and detectors 104) have been arranged to direct light towards diffusive light scattering element 111, preferably at the smallest angle possible relative to the plane 102 of the touch surface. The diffusive light scattering element 111 may be formed from a grooved surface, wherein the grooves generally run generally vertically, i.e. in the plane of the schematic cross section and in the direction shown by arrow 111a, which is perpendicular to the normal of the surface of diffusive light scattering element 111. In other words, the grooves are orientated from a top edge to a bottom edge of the reflector surface such that the scattered light is primarily directed to the touch plane. Most preferably, the grooves occur in one direction. Generally speaking, the angle between the vertical (when the touch surface is horizontal) and the grooves should be minimized to optimize signal and scanline broadening. In this embodiment, the angle μ between the normal of the grooved surface and light ray coming from the emitter component is same as angle μ between normal of grooved surface and the plane of the light rays travelling to touch surface. i.e. The angle of the normal of the grooved surface bisects the angle of the light ray travelling to the grooved surface and the light ray travelling to the touch surface. Optionally, the arrangement of the grooves on the grooved surface is substantially randomized. The groove density is preferably greater than 10 per mm in a horizontal plane. Optionally, the groove depth is up to 10 microns. Preferably, the average groove width is less than 2 microns. The grooves forming the diffusive light scattering element 111 can be formed by scratching or brushing of the surface. In one embodiment, diffusive light scattering element 111 is formed from a surface of a frame element 120 directly. Frame element 120 may be an extruded profile component or, alternatively, frame element 120 is made from brushed sheet metal. Preferably, frame element 120 is formed from anodized metal, such as anodized aluminum, and the grooves of diffusive light scattering element 111 are formed from scratching or brushing the anodized layer of the aluminum. In one embodiment, the anodization is a reflective type. In one example, the anodized metal, e.g. anodized aluminium, is cosmetically black in the visible spectral range, but diffusively light scattering in the near infrared range, e.g. wavelengths above 800 nm. FIG. 16 shows an example of the total reflectance (%), i.e. diffusive and specular reflection, for black anodized aluminium as function of the wavelength (nm). The curves (denoted a-c) represent anodized aluminium material having undergone different treatments which affect the reflective characteristics. E.g. curve (c) represents raw anodized aluminium, while (b) is the machined anodized aluminium; (d) is polished anodized aluminium; and (a) is bead-blasted anodized aluminium, respectively. As seen in FIG. 16, the total reflectance increases with the wavelength in the range starting around 700 nm until about 1300 nm. It may be particularly advantageous to use wavelengths above 900 nm where many anodized materials start to reflect significantly (e.g. around 50%). FIG. 17 shows another schematic example of a touch sensing apparatus 100, described further below, where a frame element 120, 120', may comprise black anodized aluminium where diffusive light scattering surfaces 111, 111', 111" are provided along the light path 110. The anodized surfaces may not only be used as a diffusive light scattering element but may also be utilized as a reflective element that allows better light management, e.g. recycling of light and reflecting light from lost directions towards the diffusive light scattering element 111.

Turning again to the light directing arrangement 130 shown in the example of FIG. 17, the light path 110 is directed through the panel 101, hitting an angled diffusive light scattering surface or element 111, which may be an anodized metal surface, e.g. anodized aluminium, as exemplified above. Further diffusive light scattering surfaces 111', 111", are provided on the opposite side of the panel 101 along a cavity 131 through which the light travels between the emitter 103 (or detector 104) and the backside of the panel 101. The anodized extruded aluminium part of the frame element 120, 120', may be cosmetically black, but diffusively reflective in the infrared wavelengths. It is conceivable that other anodized metals and alloys may provide for an advantageous diffusive scattering of the light along the light path 110. This provides for a compact light directing arrangement 130 since separate diffusive light scattering elements may be dispensed with, and the number of components may be reduced.

A light absorbing surface 126 may be provided at the frame element 120 comprising the angled diffusive light scattering surface 111, arranged above the touch surface 102, as schematically illustrated in FIG. 17. The light absorbing surface 126 provides for reducing unwanted reflections from ambient light. The light absorbing surface 126 may be omitted in some examples, providing for reducing the height of the angled frame element 120 above the panel 101, i.e. to reduce the bezel height. A second light absorbing surface 126' may be provided between the panel 101 and the frame element 120', at the backside of the panel 101, opposite the touch surface 102, as schematically illustrated in FIG. 17 to further reduce unwanted light reflections from ambient light. The light directing arrangement 130 in the example of FIG. 17 may be particularly advantageous in some applications where additional compactness is desired, since a light coupling element 106 or angular filter structure 112 having a longitudinal portion 118 may be omitted. This provides also for reducing the cost of the touch sensing apparatus 100. The angle by which the light scatters across the panel 101 may be further increased, providing for an improved scanline coverage across the panel 101, as Fresnel reflection losses can be avoided with the light directing arrangement 130 exemplified in FIG. 17. The panel 101 may act as a sealing portion, similar to the transparent sealing portion 121 referred to above, to protect electronics from e.g. liquids and dust. The angles of incidence may preferably be kept low through the panel 101, compared to examples where a separate sealing portion 121 is placed after the diffusive light scattering element 111. The panel 101 may be provided with a print to block unwanted ambient light and to provide for a pleasing cosmetic appearance.

In a variation of any of the above embodiments wherein the diffusive light scattering element provides a reflector surface (e.g. FIGS. 1a-b, 2a-b, 4, 5, 8, 10, 11, 12, 13, 14, 15, 17), the diffusive light scattering element may be provided with no or insignificant specular component. This may be achieved by using either a matte diffuser film in air, an internal reflective bulk diffusor or a bulk transmissive diffusor. This allows effective scanline broadening by avoiding the narrow, super-imposed specular scanline usually resulting from a diffusor interface having a specular component, and providing only a broad, diffused scanline profile. By removing the super-imposed specular scanline from the touch signal, the system can more easily use the broad, diffused scanline profile. Preferably, the diffusive light scattering element has a specular component of less than 1%, and even more preferably, less than 0.1%. Alternatively, where the specular component is greater than 0.1%, the diffusive light scattering element is preferably configured with surface roughness to reduce glossiness. E.g. micro structured.

The touch sensing apparatus may further comprise a shielding layer (not shown). The shielding layer may define an opaque frame around the perimeter of the panel 102. The shielding layer may increase the efficiency in providing the diffusively reflected light in the desired direction, e.g. by recycling the portion of the light that is diffusively reflected by the diffusive light scattering element 111, 111', 111", in a direction away from the panel 101. Similarly, providing a shielding layer on the light coupling element 106, 112, or frame element 120, 120', arranged at a detector 104 can further reduce the amount of stray light and ambient light that reaches the detector 104. The shielding layer may have the additional function of blocking entry of ambient light through the light coupling element 106, 112, or generally along the light path 110 between the diffusive light scattering element 111, 111', 111", and the detector/emitter 103, 104, as in FIG. 17.

The panel 101 may be made of glass, poly(methyl methacrylate) (PMMA) or polycarbonates (PC). The panel 101 may be designed to be overlaid on or integrated into a display device or monitor (not shown). It is conceivable that the panel 101 does not need to be light transmissive, i.e. in case the output of the touch does not need to be presented through panel 101, via the mentioned display device, but instead displayed on another external display or communicated to any other device, processor, memory etc.

As used herein, the emitters 103 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 103 may also be formed by the end of an optical fiber. The emitters 103 may generate light in any wavelength range. The following examples presume that the light is generated in the infrared (IR), i.e. at wavelengths above about 750 nm. Analogously, the detectors 104 may be any device capable of converting light (in the same wavelength range) into an electrical signal, such as a photo-detector, a CCD device, a CMOS device, etc.

With respect to the discussion above, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffuse reflection is also known as "scattering".

The disclosure has mainly been described above with reference to a few embodiments. However, as is readily appreciated by a person skilled in the art, other embodiments than the ones disclosed above are equally possible within the scope and spirit of the disclosure, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, across a panel and detecting, at a number of detectors, a change in the received light caused by an interaction with the transmitted light at the point of touch.

What is claimed is:

1. A touch sensing apparatus comprising:
   a panel that defines a touch surface, the panel having sides extending parallel to a normal of the touch surface;
   a frame element formed from a metal and being mounted along a perimeter of the panel, the frame element extends along in a direction parallel to the normal, overlapping and opposite said sides of the panel;
   a plurality of emitters and detectors arranged along the perimeter of the panel; and
   a light directing arrangement integrated with the frame element,
      wherein the emitters are arranged to emit a respective beam of emitted light and the light directing arrangement is arranged to direct the light along a light path from the emitters to the touch surface, and
      wherein the light directing arrangement comprises an anodized surface of the frame element.

2. The touch sensing apparatus according to claim 1, wherein the anodized surface is black anodized aluminium.

3. The touch sensing apparatus according to claim 1, wherein the anodized surface is one of raw anodized aluminium, machine anodized aluminium, polished anodized aluminium, or blasted anodized aluminium.

4. The touch sensing apparatus according to claim 1, wherein the anodized surface is configured to reflect near-infrared light.

5. The touch sensing apparatus according to claim 4, wherein the anodized surface is configured to reflect at least 50% of near-infrared light emitted from the plurality of emitters.

6. The touch sensing apparatus according to claim 4, wherein the anodized surface is configured to reflect near-infrared light with a wavelength between 800 nm to 2500 nm.

7. The touch sensing apparatus according to claim 1, wherein the anodized surface is a reflective element.

8. The touch sensing apparatus according to claim 1, wherein the anodized surface is a diffusive light scattering element.

9. The touch sensing apparatus according to claim 8, wherein the diffusive light scattering element comprises at least one of an engineered diffusor, a substantially Lambertian diffusor, or a coating.

10. The touch sensing apparatus according to claim 8, wherein the diffusive light scattering element provides a reflector surface with a specular component of less than 5-10%.

11. The touch sensing apparatus according to claim 7, wherein the anodized surface comprises a grooved surface and wherein the grooves are orientated from a top edge to a bottom edge of the anodized surface such that scattered light is primarily directed to the touch surface.

12. The touch sensing apparatus according to claim 11, wherein the grooves are formed from scratching or brushing.

13. The touch sensing apparatus according to claim 1 wherein the frame element and the surface to be anodized are extruded.

14. The touch sensing apparatus according to claim 1, wherein the anodized surface is angled with respect to the panel.

15. The touch sensing apparatus according to claim 1, wherein the plurality of emitters and detectors are mounted below the panel.

16. The touch sensing apparatus according to claim 1, wherein the plurality of emitters are configured to emit light around the perimeter of the panel or through the panel towards the anodized surface.

17. The touch sensing apparatus according to claim 1, wherein the light directing arrangement is configured to reflect an incident ray of the light beam through a range of angles.

18. A frame assembly for a touch sensing apparatus having a plurality of emitters and detectors arranged along a perimeter of a panel that defines a touch surface, the panel having sides extending parallel to a normal of the touch surface, wherein the emitters are arranged to emit a respective beam of emitted light, wherein the frame assembly is configured to mount along a perimeter of the panel so that a frame element formed from a metal extends along in a direction parallel to the normal, overlapping and opposite said sides of the panel, and wherein the frame assembly comprises:
    a light directing arrangement configured to direct the light along a light path from the emitters to the touch surface, wherein the light directing arrangement comprises an anodized surface of the frame assembly.

19. A method of manufacturing a touch sensing apparatus having a plurality of emitters and detectors arranged along a perimeter of a panel that defines a touch surface, the panel having side extending parallel to a normal of the touch surface, wherein the emitters are arranged to emit a respective beam of emitted light comprising:
    extruding a metal frame element,
    anodizing a surface of the frame element to provide an anodized surface as a light directing arrangement configured to direct the light along a light path from the emitters to the touch surface;
    and
    mounting the frame element along the perimeter of the panel such that the frame element extends along in a direction parallel to the normal, overlapping and opposite said sides of the panel, and the anodized surface is arranged in the light path.

* * * * *